US012687494B2

(12) United States Patent
　　　Hoffman

(10) Patent No.:　US 12,687,494 B2
(45) Date of Patent:　　Jul. 21, 2026

(54) SYSTEMS AND METHODS FOR NEARLY ISOTROPIC OPTICAL RESOLUTION USING TILTED STRUCTURED ILLUMINATION MICROSCOPY

(71) Applicant: 10x Genomics, Inc., Pleasanton, CA (US)

(72) Inventor: David Hoffman, Pleasanton, CA (US)

(73) Assignee: 10X GENOMICS, INC., Pleasanton, CA (US)

( * ) Notice: Subject to any disclaimer, the term of this patent is extended or adjusted under 35 U.S.C. 154(b) by 439 days.

(21) Appl. No.: 18/130,820

(22) Filed: Apr. 4, 2023

(65) Prior Publication Data

US 2023/0314327 A1　　Oct. 5, 2023

Related U.S. Application Data

(60) Provisional application No. 63/327,306, filed on Apr. 4, 2022.

(51) Int. Cl.
　　*G01N 21/64*　　　　(2006.01)
(52) U.S. Cl.
　　CPC ..... *G01N 21/6456* (2013.01); *G01N 21/6428* (2013.01); *G01N 2021/6439* (2013.01)
(58) Field of Classification Search
　　CPC ........... G01N 21/6456; G01N 21/6428; G01N 2021/6439; G01N 21/6458; G02B 21/14; G02B 21/0076; G02B 21/367
　　See application file for complete search history.

(56) References Cited

U.S. PATENT DOCUMENTS 5,635,352 A　6/1997　Urdea et al.
5,695,940 A　12/1997　Drmanac et al.
　　　　　(Continued)

FOREIGN PATENT DOCUMENTS

WO　　WO 2017/143155　　8/2017
WO　　WO-2018106678 A1 *　6/2018　.............　G02B 21/16
　　　　　(Continued)

OTHER PUBLICATIONS

Ali et al. "Rolling circle amplification: a versatile tool for chemical biology, materials science and medicine." *Chemical Society Reviews* 43.10 (2014): 3324-3341.

(Continued)

*Primary Examiner* — Uzma Alam
*Assistant Examiner* — Mamadou Faye
(74) *Attorney, Agent, or Firm* — MORRISON & FOERSTER LLP

(57)　　　　ABSTRACT

A tilted structured illumination pattern for use in an optical system is generated, wherein the tilted structured illumination pattern is not symmetrical about a center point of a back pupil of the system, and wherein the tilted structured illumination pattern is based on exactly two wave vectors and defines spatial frequencies along an optical axis of an objective of the system. The tilted structured illumination pattern is directed to be incident on a sample, such that one or more fluorophores of the sample are excited by the structured illumination pattern. A phase of the tilted structured illumination pattern is varied. A set of images of fluorescence emission emitted by the sample is captured, wherein each image of the set of images corresponds to a respective phase of the tilted structured illumination pattern and to a respective axial imaging plane. Combined image data is generated based on the set of images.

21 Claims, 9 Drawing Sheets
(4 of 9 Drawing Sheet(s) Filed in Color)

100

(56) References Cited

U.S. PATENT DOCUMENTS

| | | | |
|---|---|---|---|
| 6,054,274 | A | 4/2000 | Sampson et al. |
| 6,265,552 | B1 | 7/2001 | Schatz |
| 6,291,187 | B1 | 9/2001 | Kingsmore et al. |
| 6,306,597 | B1 | 10/2001 | Macevicz |
| 6,323,009 | B1 | 11/2001 | Lasken et al. |
| 6,344,329 | B1 | 2/2002 | Lizardi et al. |
| 6,368,801 | B1 | 4/2002 | Faruqi |
| 6,534,266 | B1 | 3/2003 | Singer |
| 6,828,109 | B2 | 12/2004 | Kaplan et al. |
| 7,255,994 | B2 | 8/2007 | Lao |
| 7,264,929 | B2 | 9/2007 | Rothberg et al. |
| 7,473,767 | B2 | 1/2009 | Dimitrov |
| 7,534,991 | B2 | 5/2009 | Miller et al. |
| 7,555,155 | B2 | 6/2009 | Levenson et al. |
| 7,632,641 | B2 | 12/2009 | Dirks et al. |
| 7,655,898 | B2 | 2/2010 | Miller |
| 7,721,721 | B1 | 5/2010 | Kronengold et al. |
| 7,910,304 | B2 | 3/2011 | Drmanac |
| 7,941,279 | B2 | 5/2011 | Hwang et al. |
| 7,989,166 | B2 | 8/2011 | Koch et al. |
| 8,124,751 | B2 | 2/2012 | Pierce et al. |
| 8,199,999 | B2 | 6/2012 | Hoyt et al. |
| 8,268,554 | B2 | 9/2012 | Schallmeiner |
| 8,330,087 | B2 | 12/2012 | Domenicali |
| 8,415,102 | B2 | 4/2013 | Geiss et al. |
| 8,431,691 | B2 | 4/2013 | McKernan et al. |
| 8,462,981 | B2 | 6/2013 | Determan et al. |
| 8,481,258 | B2 | 7/2013 | Church et al. |
| 8,519,115 | B2 | 8/2013 | Webster et al. |
| 8,551,710 | B2 | 10/2013 | Bernitz et al. |
| 8,658,361 | B2 | 2/2014 | Wu et al. |
| 8,771,950 | B2 | 7/2014 | Church et al. |
| 8,986,926 | B2 | 3/2015 | Ferree et al. |
| 9,201,063 | B2 | 12/2015 | Sood et al. |
| 9,273,349 | B2 | 3/2016 | Nguyen et al. |
| 9,371,563 | B2 | 6/2016 | Geiss et al. |
| 9,371,598 | B2 | 6/2016 | Chee |
| 9,376,717 | B2 | 6/2016 | Gao et al. |
| 9,541,504 | B2 | 1/2017 | Hoyt |
| 9,551,032 | B2 | 1/2017 | Landegren et al. |
| 9,588,045 | B2 * | 3/2017 | Kleppe ................... G02B 27/58 |
| 9,624,538 | B2 | 4/2017 | Church et al. |
| 9,714,446 | B2 | 7/2017 | Webster et al. |
| 9,714,937 | B2 | 7/2017 | Dunaway |
| 9,727,810 | B2 | 8/2017 | Fodor et al. |
| 9,778,155 | B2 | 10/2017 | Gradinaru et al. |
| 9,783,841 | B2 | 10/2017 | Nolan et al. |
| 9,909,167 | B2 | 3/2018 | Samusik et al. |
| 10,032,064 | B2 | 7/2018 | Hoyt |
| 10,059,990 | B2 | 8/2018 | Boyden et al. |
| 10,126,242 | B2 | 11/2018 | Miller et al. |
| 10,179,932 | B2 | 1/2019 | Church et al. |
| 10,227,639 | B2 | 3/2019 | Levner et al. |
| 10,246,700 | B2 | 4/2019 | Dunaway et al. |
| 10,266,888 | B2 | 4/2019 | Daugharthy et al. |
| 10,267,808 | B2 | 4/2019 | Cai |
| 10,309,879 | B2 | 6/2019 | Chen et al. |
| 10,317,321 | B2 | 6/2019 | Tillberg et al. |
| 10,364,457 | B2 | 7/2019 | Wassie et al. |
| 10,370,698 | B2 | 8/2019 | Nolan et al. |
| 10,415,080 | B2 | 9/2019 | Dunaway et al. |
| 10,457,980 | B2 | 10/2019 | Cai et al. |
| 10,465,235 | B2 | 11/2019 | Gullberg et al. |
| 10,494,662 | B2 | 12/2019 | Church et al. |
| 10,495,554 | B2 | 12/2019 | Deisseroth et al. |
| 10,501,777 | B2 | 12/2019 | Beechem et al. |
| 10,501,791 | B2 | 12/2019 | Church et al. |
| 10,510,435 | B2 | 12/2019 | Cai et al. |
| 10,526,649 | B2 | 1/2020 | Chen et al. |
| 10,545,075 | B2 | 1/2020 | Deisseroth et al. |
| 10,550,429 | B2 | 2/2020 | Harada et al. |
| 10,580,128 | B2 | 3/2020 | Miller |
| 10,640,816 | B2 | 5/2020 | Beechem et al. |
| 10,640,826 | B2 | 5/2020 | Church et al. |
| 10,669,569 | B2 | 6/2020 | Gullberg et al. |
| 10,746,981 | B2 | 8/2020 | Tomer et al. |
| 10,774,372 | B2 | 9/2020 | Chee et al. |
| 10,774,374 | B2 | 9/2020 | Frisén et al. |
| 10,794,802 | B2 | 10/2020 | Gradinaru et al. |
| 10,802,262 | B2 | 10/2020 | Tomer et al. |
| 10,815,519 | B2 | 10/2020 | Husain et al. |
| 10,829,814 | B2 | 11/2020 | Fan et al. |
| 10,844,426 | B2 | 11/2020 | Daugharthy et al. |
| 10,858,698 | B2 | 12/2020 | Church et al. |
| 10,872,679 | B2 | 12/2020 | Cai et al. |
| 10,964,001 | B2 | 3/2021 | Miller |
| 11,459,603 | B2 | 10/2022 | Tyagi et al. |
| 2006/0234261 | A1 | 10/2006 | Pierce et al. |
| 2009/0250632 | A1 * | 10/2009 | Kempe .............. G02B 21/0076 |
| | | | 250/237 G |
| 2011/0223585 | A1 | 9/2011 | Gullberg et al. |
| 2012/0257197 | A1 * | 10/2012 | Feldkhun ........... G01N 21/4795 |
| | | | 356/450 |
| 2013/0288249 | A1 | 10/2013 | Gullbert |
| 2013/0323729 | A1 | 12/2013 | Landegren et al. |
| 2014/0055594 | A1 * | 2/2014 | Nomura .................. G02B 21/06 |
| | | | 348/79 |
| 2016/0108458 | A1 | 4/2016 | Frei et al. |
| 2016/0305856 | A1 | 10/2016 | Boyden et al. |
| 2016/0376642 | A1 | 12/2016 | Landegren et al. |
| 2017/0009278 | A1 | 1/2017 | Söderberg et al. |
| 2017/0081489 | A1 | 3/2017 | Rodriques et al. |
| 2017/0101672 | A1 | 4/2017 | Luo et al. |
| 2017/0220733 | A1 | 8/2017 | Zhuang et al. |
| 2017/0253918 | A1 | 9/2017 | Kohman |
| 2018/0052081 | A1 | 2/2018 | Kohman |
| 2018/0080876 | A1 | 3/2018 | Rockel et al. |
| 2018/0177401 | A1 * | 6/2018 | Yang ................. G01N 21/6458 |
| 2018/0208967 | A1 | 7/2018 | Larman et al. |
| 2018/0237864 | A1 | 8/2018 | Imler et al. |
| 2018/0320226 | A1 | 11/2018 | Church et al. |
| 2019/0017106 | A1 | 1/2019 | Frisen et al. |
| 2019/0032128 | A1 | 1/2019 | Chen et al. |
| 2019/0055594 | A1 | 2/2019 | Samusik et al. |
| 2019/0106733 | A1 | 4/2019 | Kishi et al. |
| 2019/0112599 | A1 | 4/2019 | Church et al. |
| 2019/0119735 | A1 | 4/2019 | Deisseroth et al. |
| 2019/0155835 | A1 | 5/2019 | Daugharthy et al. |
| 2019/0161796 | A1 | 5/2019 | Hauling et al. |
| 2019/0177718 | A1 | 6/2019 | Church et al. |
| 2019/0177800 | A1 | 6/2019 | Boutet et al. |
| 2019/0194709 | A1 | 6/2019 | Church et al. |
| 2019/0218608 | A1 | 7/2019 | Daugharthy et al. |
| 2019/0249248 | A1 | 8/2019 | Beechem et al. |
| 2019/0264270 | A1 | 8/2019 | Zhuang et al. |
| 2019/0271028 | A1 | 9/2019 | Khafizov et al. |
| 2019/0276881 | A1 | 9/2019 | Zhuang et al. |
| 2019/0339203 | A1 | 11/2019 | Miller et al. |
| 2019/0367969 | A1 | 12/2019 | Belhocine |
| 2019/0376956 | A1 | 12/2019 | Bobrow et al. |
| 2019/0391378 | A1 * | 12/2019 | Eichelkraut ............ G02B 21/36 |
| 2020/0010891 | A1 | 1/2020 | Beechem et al. |
| 2020/0071751 | A1 | 3/2020 | Daugharthy et al. |
| 2020/0123597 | A1 | 4/2020 | Daniel |
| 2020/0140920 | A1 | 5/2020 | Pierce et al. |
| 2020/0224243 | A1 | 7/2020 | Desai et al. |
| 2020/0224244 | A1 | 7/2020 | Nilsson et al. |
| 2020/0239946 | A1 | 7/2020 | Dewal |
| 2020/0354774 | A1 | 11/2020 | Church et al. |
| 2020/0354782 | A1 | 11/2020 | Dewal |
| 2020/0362398 | A1 | 11/2020 | Kishi et al. |
| 2020/0393343 | A1 | 12/2020 | Kennedy-Darling et al. |
| 2020/0399689 | A1 | 12/2020 | Luo et al. |
| 2021/0017587 | A1 | 1/2021 | Cai et al. |
| 2021/0098973 | A1 * | 4/2021 | Gong .................... G02B 26/06 |
| 2021/0115504 | A1 | 4/2021 | Cai et al. |
| 2021/0238662 | A1 | 8/2021 | Bava |
| 2021/0238674 | A1 | 8/2021 | Bava |
| 2021/0254140 | A1 | 8/2021 | Stahl et al. |
| 2021/0262018 | A1 | 8/2021 | Bava et al. |
| 2021/0277460 | A1 | 9/2021 | Bava |
| 2021/0340621 | A1 | 11/2021 | Daugharthy et al. |
| 2021/0388423 | A1 | 12/2021 | Bava et al. |
| 2021/0388424 | A1 | 12/2021 | Bava |

(56) References Cited

U.S. PATENT DOCUMENTS

| | | | |
|---|---|---|---|
| 2022/0049302 A1 | 2/2022 | Daugharthy et al. | |
| 2022/0049303 A1 | 2/2022 | Busby et al. | |
| 2022/0083832 A1 | 3/2022 | Shah | |
| 2022/0084628 A1 | 3/2022 | Shah | |
| 2022/0084629 A1 | 3/2022 | Shah | |
| 2022/0136049 A1 | 5/2022 | Bava et al. | |
| 2022/0186300 A1 | 6/2022 | Bava | |
| 2022/0195498 A1 | 6/2022 | Kuhnemund et al. | |
| 2022/0213529 A1 | 7/2022 | Kuhnemund et al. | |
| 2022/0228200 A1 | 7/2022 | Bava | |
| 2022/0390369 A1 * | 12/2022 | Piestun | G01N 21/47 |

FOREIGN PATENT DOCUMENTS

| | | | | |
|---|---|---|---|---|
| WO | WO 2019/199579 | 10/2019 | | |
| WO | WO 2019/236841 | 12/2019 | | |
| WO | WO 2020/076976 | 4/2020 | | |
| WO | WO 2020/076979 | 4/2020 | | |
| WO | WO 2020/096687 | 5/2020 | | |
| WO | WO 2020/099640 | 5/2020 | | |
| WO | WO 2020/102094 | 5/2020 | | |
| WO | WO 2020/117914 | 6/2020 | | |
| WO | WO 2020/123316 | 6/2020 | | |
| WO | WO 2020/123742 | 6/2020 | | |
| WO | WO 2020/142490 | 7/2020 | | |
| WO | WO 2020/163397 | 8/2020 | | |
| WO | WO 2020/240025 | 12/2020 | | |
| WO | WO 2020/254519 | 12/2020 | | |
| WO | WO 2021/067475 | 4/2021 | | |
| WO | WO 2021/123282 | 6/2021 | | |
| WO | WO 2021/123286 | 6/2021 | | |
| WO | WO-2021122471 A1 * | 6/2021 | | G02B 21/16 |
| WO | WO 2021/155063 | 8/2021 | | |
| WO | WO 2021/168326 | 8/2021 | | |

OTHER PUBLICATIONS

Archer et al., "Selective and flexible depletion of problematic sequences from RNA-seq libraries at the cDNA stage," BMC Genomics. (2014) 15(1):401.

Asp et al., "Spatially Resolved Transcriptomes-Next Generation Tools for Tissue Exploration," Bioessays. (2020) 42(10):e1900221.

Baner et al., "Signal amplification of padlock probes by rolling circle replication," Nucleic Acids Res. (1998) 26(22):5073-5078.

Bibikova et al., "Quantitative gene expression profiling in formalin-fixed, paraffin-embedded tissues using universal bead arrays," Am J Pathol. Nov. 2004;165(5):1799-807.

Bolognesi et al., "Multiplex Staining by Sequential Immunostaining and Antibody Removal on Routine Tissue Sections," J. Histochem. Cytochem. (2017); 65(8): 431-444.

Capodieci et al., "Gene expression profiling in single cells within tissue," Nat Methods. (2005) 2(9): 663-5.

Chemeris et al., "Real-time hybridization chain reaction," Dokl Biochem Biophys. (2008) 419: 53-55.

Chen et al., "Nanoscale imaging of RNA with expansion microscopy," Nat Methods. (2016) 13:679-684.

Chen et al., "Expansion Microscopy," Science (2015) 347(6221):543-548.

Choi et al., "Programmable in situ amplification for multiplexed imaging of mRNA expression," Nat Biotechnol. (2010) 28(11):1208-1212.

Combs et al., "Fluorescence Microscopy: A Concise Guide to Current Imaging Methods," Curr Protoc Neurosci. (2017) 79:2.1.1-2.1.25.

Conze et al., "Single molecule analysis of combinatorial splicing," Nucleic Acids Res. (2010) 38(16): e163.

Dean et al., "Rapid Amplification of Plasmid and Phage DNA Using Phi29 DNA Polymerase and Multiply-Primed Rolling Circle Amplification," Genome Research (2001) 11:1095-1099.

Dirks et al., "Triggered amplification by hybridization chain reaction," Proc Natl Acad Sci U S A. (2004) 101(43): 15275-15278.

Dutta et al., "Electroosmotic flow control in complex microgeometries," in Journal of Microelectromechanical Systems, (2002) 11(1); 36-44.

Fang et al., "Fluoride-Cleavable Biotinylation Phosphoramidite for 5'-end-Labelling and Affinity Purification of Synthetic Oligonucle-otides," Nucleic Acids Res. (2003) 31(2): 708-715.

Faruqi et al., "High-throughput genotyping of single nucleotide polymorphisms with rolling circle amplification," BMC Genomics. (2001) 2:4.

Femino et al., "Visualization of single RNA transcripts in situ," Science. (1998) 280(5363): 585-90.

Gale et al., "A Review of Current Methods in Microfluidic Device Fabrication and Future Commercialization Prospects," Inventions 2018, 3(3), 60; 25 pages.

Gavrilovic et al., "Automated classification of multicolored rolling circle products in dual-channel wide-field fluorescence micros-copy," Cytometry A. (2011) 79(7): 518-27.

Geiss et al., "Direct multiplexed measurement of gene expression with color-coded probe pairs," Nat Biotechnol. (2008) 26(3): 317-25.

Ghosal, S. "Fluid mechanics of electroosmotic flow and its effect on band broadening in capillary electrophoresis," Electrophoresis. (2004) 25(2):214-28.

Glass et al., "Simple: a sequential immunoperoxidase labeling and erasing method," J Histochem Cytochem. (2009) 57(10); 899-905.

Goh, J.J.L. et al. (Jul. 2020, e-pub. Jun. 15, 2020). "Highly Specific Multiplexed RNA Imaging in Tissues With Split-Fish," Nat Meth-ods 17(7):689-693. doi: 10.1038/s41592-020-0858-0. Epub Jun. 15, 2020.

Goransson et al., "A single molecule array for digital targeted molecular analyses," Nucleic Acids Res. 2009 37(1):e7. doi: 10.1093/nar/gkn921.

Gunderson et al. "Decoding randomly ordered DNA arrays." Genome research 14.5 (2004): 870-877.

Han et al., "Quantum-dot-tagged microbeads for multiplexed opti-cal coding of biomolecules," Nat Biotechnol. (2001) 19(7): 631-5.

Itzkovitz et al., "Single-molecule transcript counting of stem-cell markers in the mouse intestine," Nat Cell Biol. (2011) 14(1): 106-14.

Itzkovitz et al., "Validating Transcripts with Probes and Imaging Technology," Nat Methods. (2011) 8(4 Suppl): S12-S19.

Jagadeesan, et al. "An Efficient Image Downsampling Technique Using Genetic Algorithm and Discrete Wavelet Transform", Journal of Theoretical and Applied Information Technology. (2014) 61(3):506-514.

Jamur et al., "Permeabilization of cell membranes," Method Mol. Biol. (2010) 588: 63-66 (abstract only).

Lagunavicius et al., "Novel application of Phi29 DNA polymerase: RNA detection and analysis in vitro and in situ by target RNA-primed RCA," RNA. (2009) 15(5):765-71.

Larsson et al. "In situ detection and genotyping of individual mRNA molecules," Nat Methods. (2010) 7(5):395-397.

Levsky et al., "Fluorescence in situ hybridization: past, present and future," J Cell Sci. (2003) 116(Pt 14): 2833-8.

Levsky et al., "Single-cell gene expression profiling," Science. (2002) 297(5582): 836-40.

Lin et al., "Highly multiplexed imaging of single cells using a high-throughput cyclic immunofluorescence method," Nat Com-mun. (2015) 6:8390.

Liu et al. Barcoded oligonucleotides ligated on RNA amplified for multiplexed and parallel in situ analyses. Nucleic Acids Res. (2021) 49(10):e58, 15 pages. doi: 10.1093/nar/gkab120.

Lizardi et al., "Mutation detection and single-molecule counting using isothermal rolling-circle amplification," Nat Genet. (1998) 19(3): 225-232.

Maierhorfer et al., "Multicolor deconvolution microscopy of thick biological specimens," Am J Pathol. (2003) 162(2): 373-9.

McGinn et al., "New technologies for DNA analysis—a review of the READNA Project," N Biotechnol. (2016) 33(3): 311-30. doi: 10.1016/j.nbt.2015.10.003.

Meade et al. "Multiplexed DNA detection using spectrally encoded porous SiO2 photonic crystal particles," Anal Chem. (2009) 81(7): 2618-25.

(56)         References Cited

OTHER PUBLICATIONS

Mertz, "Strategies for Volumetric Imaging with a Fluorescence Microscope", Optica. (2019) 6(10):1261-1268.

Miralles et al., "A Review of Heating and Temperature Control in Microfluidic Systems: Techniques and Applications," Diagnostics (Basel). 2013 3(1): 33-67.

Mohsen et al., "The Discovery of Rolling Circle Amplification and Rolling Circle Transcription," Acc Chem Res. (2016) 49(11): 2540-2550.

Nallur et al., "Signal amplification by rolling circle amplification on DNA microarrays," Nucleic Acids Res. (2001) 29(23): e118.

Niu et al., "Fluorescence detection for DNA using hybridization chain reaction with enzyme-amplification," Chem C+A277ommun (Camb). (2010) 46(18): 3089-91.

Payne et al. "In situ genome sequencing resolves DNA sequence and structure in intact biological samples," Science. (2021) 371(6532): eaay3446. doi: 10.1126/science.aay3446. Epub Dec. 31, 2020.

Pirici et al., "Antibody elution method for multiple immunohistochemistry on primary antibodies raised in the same species and of the same subtype," J Histochem Cytochem. (2009) 57(6); 567-75.

Power et al., A guide to light-sheet fluorescence microscopy for multiscale imaging. Nat Methods. (2017) 14(4):360-373.

Raj et al., "Imaging individual mRNA molecules using multiple singly labeled probes," Nat Methods. (2008) 5(10): 877-879.

Rouhanifard et al. "ClampFish detects individual nucleic acid molecules using click chemistry-based amplification," Nat Biotechnol. (2018) 17 pages. doi: 10.1038/nbt.4286.

Schweitzer et al. "Immunoassays with rolling circle DNA amplification: A versatile platform for ultrasensitive antigen detection," Proc. Natl Acad. Sci. USA (2000) 97:10113-119.

Schweitzer et al., "Multiplexed protein profiling on microarrays by rolling-circle amplification," Nature Biotech. (2002) 20:359-365.

Song et al., "Hybridization chain reaction-based aptameric system for the highly selective and sensitive detection of protein," Analyst. (2012) 137(6):1396-1401.

Sun et al., "Composite organic-inorganic nanoparticles as Raman labels for tissue analysis," Nano Lett. (2007) 7(2): 351-6.

Takei et al., (Feb. 2021, e-pub Jan. 27, 2021). "Integrated Spatial Genomics Reveals Global Architecture of Single Nuclei," Nature 590(7845):344-350, 53 pages. doi: 10.1038/s41586-020-03126-2.

Vandernoot et al., "cDNA normalization by hydroxyapatite chromatography to enrich transcriptome diversity in RNA-seq applications," Biotechniques, (2012) 53(6) 373-80.

Wåhlby et al., "Sequential immunofluorescence staining and image analysis for detection of large numbers of antigens in individual cell nuclei," Cytometry. (2002) 47(1): 32-41.

Weibrecht et al., "Simultaneous visualization of both signaling cascade activity and end-point gene expression in single cells," PLoS One. (2011) 6(5): e20148.

Wilson et al., "Encoded microcarriers for high-throughput multiplexed detection," Angew Chem Int Ed Engl. (2006) 18;45(37): 6104-17.

Wu, C. et al. "RollFISh Achieves Robust Quantification of Single-Molecule RNA Biomarkers in Paraffin-Embedded Tumor Tissue Samples," Commun Biol. (2018) 1:(209):1-8. doi: 10.1038/s42003-018-0218-0.

Xia et al. "Multiplexed detection of RNA using Merfish and branched DNA amplification." Scientific reports 9.1 (2019): 1-13.

Xu et al., "Structured illumination microscopy based on asymmetric three-beam interference," Journal of Innovative Optical Health Sciences. (2021) 14(2); 2050027.

Zhang et al., "Interpolation-Dependent Image Downsampling," in IEEE Transactions on Image Processing. (2011) 20(11); 3291-3296.

Zhao et al., "Advances of multiplex and high throughput biomolecular detection technologies based on encoding microparticles," Sci China Chem. (2011) 54(8):1185.

Zhao et al., "Rolling circle amplification: applications in nanotechnology and biodetection with functional nucleic acids," Angew Chem Int Ed Engl. (2008) 47(34): 6330-7. (Abstract and Supporting Information only).

Lubeck et al., "Single-cell in situ RNA profiling by sequential hybridization," Nature Methods. (2014) 11; 360-361.

* cited by examiner

SYSTEMS AND METHODS FOR NEARLY ISOTROPIC OPTICAL RESOLUTION USING TILTED STRUCTURED ILLUMINATION MICROSCOPY

CROSS-REFERENCE TO RELATED APPLICATION

This application claims priority to U.S. Provisional Patent Application No. 63/327,306, filed Apr. 4, 2022, entitled "SYSTEMS AND METHODS FOR NEARLY ISOTROPIC OPTICAL RESOLUTION USING TILTED STRUCTURED ILLUMINATION MICROSCOPY," which is herein incorporated by reference in its entirety for all purposes.

FIELD

The present disclosure relates generally to microscopy, and more specifically to structured illumination microscopy.

BACKGROUND

Fluorescence microscopes are widely used tools that use fluorescence to image a sample. In fluorescence microscopy, fluorophores are excited by excitation light of a fluorophore-dependent excitation wavelength and then emit fluorescence emission light of a fluorophore-dependent emission wavelength. Images of the fluorescence can be detected by a camera. Fluorescence microscopes are particularly useful in the biological fields because they allow researchers to collect high-resolution images without damaging sensitive samples.

Epifluorescence microscopy, in which both the excitation light and the emission light travels through the same objective lens, is also used for fluorescence imaging.

SUMMARY OF THE INVENTION

As set out above, fluorescence microscopy and epifluorescence microscopy are commonly used for imaging of biological samples. However, known techniques for fluorescence microscopy and epifluorescence microscopy have certain drawbacks.

For example, resolution in epifluorescence microscopy is highly anisotropic. Even in the best possible cases for known epifluorescence microscopy systems, the axial resolution will be half that of the lateral resolution.

Furthermore, known techniques for widefield epifluorescence microscopes suffer from the "missing cone" phenomenon, in that they do not have optical sectioning and they register intense out-of-focus fluorescence. Certain approaches for filling in the missing cone (adding optical sectioning) and/or increasing the optical resolution are known. For example, use of confocal microscopy, light sheet microscopy, structured illumination microscopy, and/or total internal reflection fluorescence microscopy may be applied. However, known techniques for filling in the missing cone and/or increasing optical resolution impose strong tradeoffs between these benefits, require complex architecture, and/or require increased time to collect the data.

For certain applications, including in situ techniques that use amplification, the lateral resolution of a microscope may be sufficient, while it would be beneficial to increase axial resolution and/or to add optical sectioning while minimizing degradation of throughput.

Accordingly, there is a need for improved techniques for fluorescence microscopy, including in situ epifluorescence microscopy, that increase axial resolution and/or add optical sectioning while minimizing degradation of throughput. Disclosed herein are systems, methods, and techniques that may address one or more of the above-identified needs.

Disclosed herein are novel systems, methods, and techniques for using structured illumination microscopy (SIM) to add optical sectioning, double axial resolution of a standard microscope, and only incur a six-fold decrease in throughout over a standard microscope. As described herein, these improvements may be achieved by generating a tilted structured illumination pattern that is not symmetrical about a center point of a back pupil of the system, is based on exactly two wave vectors, and defines spatial frequencies along an optical axis of an objective of the system. The tilted structured illumination pattern may be used to excite fluorophores of a sample to be imaged, and a phase of the tilted structured illumination pattern may be varied. A set of images of fluorescence emission emitted by of the sample may then be captured, wherein each image of the set of images corresponds to a respective phase of the tilted structured illumination pattern, and a combined image (e.g., an image obtained by applying a frequency domain reconstruction algorithm) having improved axial resolution may be generated based on the captured set of images.

The techniques disclosed herein may offer improvements over known techniques by adding optical sectioning and doubling axial resolution without unduly decreasing throughput. While known SIM techniques use two-dimensional or three-dimensional patterns by interfering wave vectors, known SIM techniques either (a) increase lateral and axial resolution (at the expense of decreased throughput required to obtain both improvements), (b) increase lateral resolution but not optical sectioning, or (c) increase lateral resolution moderately and add optical sectioning. Known techniques are not able to increase axial resolution and add optical sectioning while improving lateral resolution slightly and incurring only a slight decrease in throughput (a less significant decrease than known SIM techniques) over conventional microscopy. For example, while known 3D-SIM techniques impose a 30-fold decrease in throughput compared to standard microscopy, the tilted-SIM techniques disclosed herein only impose a six-fold decrease. As another example, while ApoTome and known OS-SIM techniques impose as little as a threefold decrease in throughput (though as much as a five-fold or more decrease in throughput), they only add optical sectioning and offer no increase in axial resolution. Thus, the tilted-SIM techniques disclosed herein increase axial resolution while only slightly decreasing throughput, thereby offering an improvement over known solutions.

As described herein, a tilted-SIM illumination pattern may be generated by using only two wave vectors to generate a pattern of excitation light. As described herein, the tilted-SIM illumination pattern may be generated by combining a first beam and a second beam in a spatial distribution that is asymmetrical with respect to a back pupil of the system. The tilted-SIM illumination pattern may be usable to increase axial resolution and add optical sectioning as well as improve lateral resolution slightly in a much more efficient manner than known techniques.

In some embodiments, a method for fluorescence imaging of a sample using structured illumination, comprising: generating a tilted structured illumination pattern for use in an optical system, wherein the tilted structured illumination pattern is not symmetrical about a center point of a back pupil of the system, and wherein the tilted structured illumination pattern is based on exactly two wave vectors and defines spatial frequencies along an optical axis of an objective of the system; directing the tilted structured illumination pattern to be incident on a sample, such that one or more fluorophores of the sample are excited by the structured illumination pattern; varying a phase of the tilted structured illumination pattern; capturing a set of images of fluorescence emission emitted by one or more of the fluorophores of the sample, wherein each image of the set of images corresponds to a respective phase of the tilted structured illumination pattern and to a respective axial imaging plane; and generating combined image data based on the set of images.

In some embodiments of the method, generating the tilted structured illumination pattern comprises using a sample conjugate optical grating or a sample conjugate spatial light modulator.

In some embodiments of the method, generating the tilted structured illumination pattern comprises using a pupil conjugate mask.

In some embodiments of the method, generating the tilted structured illumination pattern comprises: generating a first beam and a second beam having a relative phase difference; and combining the first beam and the second beam in a spatial distribution that is asymmetrical with respect to a back pupil of the system, to create the tilted structured illumination pattern.

In some embodiments of the method, combining the first beam and the second beam comprises directing one of the first beam and the second beam into the center point of the back pupil of the system.

In some embodiments of the method, generating the tilted structured illumination pattern comprises controlling the relative phase difference between the first beam and the second beam.

In some embodiments of the method, controlling relative phase difference comprises applying an electro-optic retarder or a physical delay to one of the first beam and the second beam.

In some embodiments of the method, directing the tilted structured illumination pattern to be incident on the sample comprises rotating the second beam around an edge of a pupil.

In some embodiments of the method, the combined image data has double the nominal axial resolution of the objective.

In some embodiments of the method, the combined image data has an axial resolution of $\lambda/(2\ (n-\sqrt{n^2-(NA)^2}))$.

In some embodiments of the method, a curve of integrated power against axial position for the combined image data has a full-width-half-max (FWHM) that is less than or equal to 80% the width of a FWHM of a curve of integrated power against axial position for a combined image generated using optical-sectioning structured illumination microscopy (OS-SIM) generated using the optical system and a structured illumination pattern configured for OS-SIM imaging.

In some embodiments of the method, the set of images comprises six or more images.

In some embodiments of the method, the set of images is a set of exactly six images.

In some embodiments of the method, the sample comprises one or more punctate structures having sub-diffractive structures.

In some embodiments of the method, the sample comprises one or more structures that are sub-diffractive in an axial direction of the objective but that are not sub-diffractive in a lateral direction of the objective.

In some embodiments of the method, the sample comprises a tissue sample comprising fluorescence probes.

In some embodiments of the method, an optical axis of illumination of the system is decentered from the optical axis of the objective of the system.

In some embodiments, a system for fluorescence imaging of a sample using structured illumination is provided, comprising: a light source configured to generate illumination light; a wave vector control device configured to generating a tilted structured illumination pattern for use in an optical system, wherein the tilted structured illumination pattern is not symmetrical about a center point of a back pupil of the system, and wherein the tilted structured illumination pattern is based on exactly two wave vectors and defines spatial frequencies along an optical axis of an objective of the system; an objective configured to direct the tilted structured illumination pattern to be incident on a sample, such that one or more fluorophores of the sample are excited by the structured illumination pattern; wherein the wave vector control device is configured to vary the phase of the tilted structured illumination pattern; a sensor configured to capture a set of images of fluorescence emission emitted by one or more of the fluorophores of the sample, wherein each image of the set of images corresponds to a respective phase of the tilted structured illumination pattern and to a respective axial imaging plane; and one or more processors configured to generate combined image data based on the set of images.

In some embodiments of the system, the wave vector control device comprises a sample conjugate optical grating or a spatial light modulator.

In some embodiments of the system, the wave vector control device comprises a pupil conjugate mask.

In some embodiments, a computer program product is provided comprising a computer readable storage medium having program instructions embodied therewith, the program instructions executable by a processor to cause the processor to perform a method comprising: generating, by the wave vector control device, a tilted structured illumination pattern for use in an optical system, wherein the tilted structured illumination pattern is not symmetrical about a center point of a back pupil of the system, wherein the tilted structured illumination pattern is based on exactly two wave vectors and defines spatial frequencies along an optical axis of an objective of the system; directing, by the objective, the tilted structured illumination pattern to be incident on a sample, such that one or more fluorophores of the sample are excited by the structured illumination pattern; varying, by the wave vector control device, a phase of the tilted structured illumination pattern; capturing, by the sensor, a set of images of fluorescence emission emitted by one or more of the fluorophores of the sample, wherein each image of the set of images corresponds to a respective phase of the tilted structured illumination pattern and to a respective axial imaging plane; and generating, by the one or more processors, combined image data based on the set of images.

In some embodiments, any one or more features of any of the above embodiments may be combined, in whole or in part, with one another and/or with any other features disclosed herein.

BRIEF DESCRIPTION OF THE FIGURES

The patent or application file contains at least one drawing executed in color. Copies of this patent or patent application publication with color drawings will be provided by the office upon request and payment of the necessary fee.

DETAILED DESCRIPTION

Figure 1:
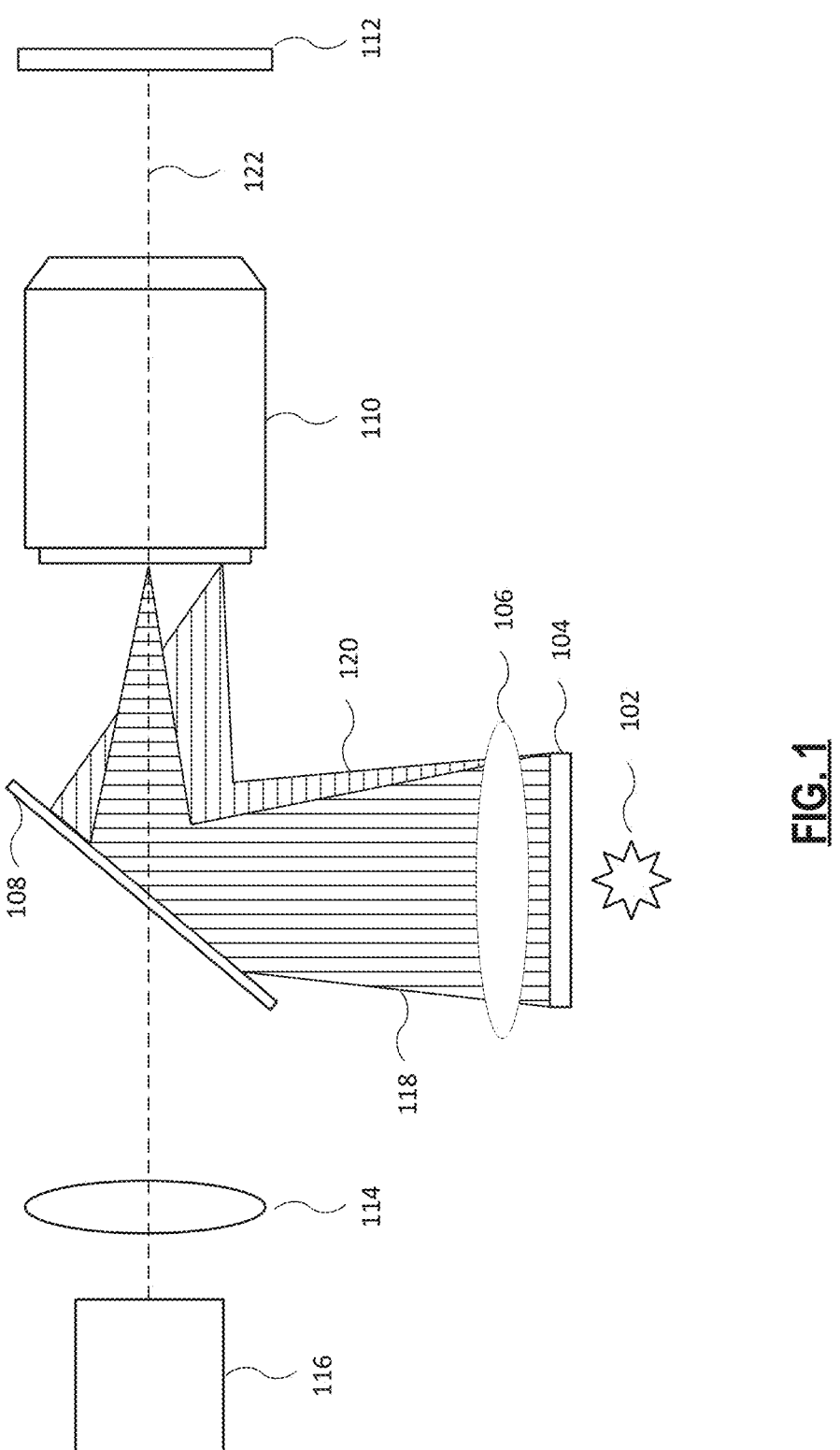
FIG. 1 shows a diagram of a system for fluorescence imaging of a sample using structured illumination, in accordance with some embodiments.

The systems, methods, and techniques disclosed herein may be used to apply structured illumination microscopy (SIM) to add optical sectioning, double axial resolution of a standard microscope, and only incur a six-fold decrease in throughout over a standard microscope. These improvements may be achieved by generating a tilted structured illumination pattern in which the structure is tilted with respect to the optical axis within the sample, is not symmetrical (i.e., asymmetric) about a center point of a back pupil of the system, is based on exactly two wave vectors, and defines spatial frequencies along an optical axis of an objective of the system. The tilted-SIM illumination pattern may be generated by combining a first beam and a second beam in a spatial distribution that is asymmetrical with respect to a back pupil of the system. The two wave vectors may be generated and controlled using, for example, a grating and/or a spatial light modulator (SLM). The tilted structured illumination pattern may be used to excite fluorophores of a sample to be imaged, and a phase of the tilted structured illumination pattern may be varied. A set of images of fluorescence emission emitted by of the sample may then be captured, wherein each image of the set of images corresponds to a respective phase of the tilted structured illumination pattern, and a combined image that provides improved axial resolution (e.g., a super-resolution image) may be generated based on the captured set of images.

SIM allows for observation of fluorescent samples at resolutions below the limit the diffraction of light imposes on any optical microscope. This limit, defined by Abbe, is at best ~200 nm laterally and ~500 nm axially, which is well above the resolution necessary to discriminate between different single molecules, or even ensemble of molecules within a cellular compartment. Super-resolution approaches, such as SIM, can generate images with resolution below this diffraction limit and are therefore extremely useful for the visualization of structural organization and the quantification of dynamic processes down to the molecular level (e.g., for in situ imaging of RNA transcripts, proteins, etc.).

SIM may include laser-based wide-field microscopy having a movable diffraction grating disposed along the excitation beam path. Zero order and/or only first order diffracted laser beams (respectively to achieve 3D- or 2D-SIM) are allowed to pass through the objective. These laser beams interfere with each other at the focal plane of the objective and generate an illumination pattern having stripes (the light intensity follows sinusoidal waves). This stripe pattern of light generates a so-called Moiré effect by its superimposition with the sample.

Under homogeneous illumination, objects separated by a small distance (organized at high frequency) are not visible due to the point-spread-function of the objective. Using structured illumination, the overlap between the high frequency organization of the objects within the sample and the high frequency of the illumination stripes creates a pattern of lower frequency that can be collected by the objective (given its point spread function).

To reconstruct the final super-resolved image, several raw images may be collected, each being acquired at different orientation of the structured illumination. In various embodiments, the diffraction grating may be moved (translation and rotation) to obtain two or more images having a different orientation of the structured illumination. To obtain a 2D-SIM SR-image, 9 raw images are required (3 translations×3 rotations) and, to obtain a 3D-SIM SR-images, 15 images are required (5 translations×3 rotations).

General Terminology

Specific terminology is used throughout this disclosure to explain various aspects of the methods, systems, and compositions that are described. Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. For example, "a" or "an" means "at least one" or "one or more". Any reference to "or" herein is intended to encompass "and/or" unless otherwise stated.

As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, un-recited additives, components, integers, elements or method steps.

As used herein, the term "about" a number refers to that number plus or minus 10% of that number. The term 'about' when used in the context of a range refers to that range minus 10% of its lowest value and plus 10% of its greatest value.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

The term "platform" (or "system") may refer to an ensemble of: (i) instruments (e.g., imaging instruments, fluid controllers, temperature controllers, motion controllers and translation stages, etc.), (ii) devices (e.g., specimen slides, substrates, flow cells, microfluidic devices, etc., which may comprise fixed and/or removable or disposable components of the platform), (iii) reagents and/or reagent kits, and (iv) software, or any combination thereof, which allows a user to perform one or more bioassay methods (e.g., analyte detection, in situ detection, and/or nucleic acid detection) depending on the particular combination of instruments, devices, reagents, reagent kits, and/or software utilized.

The section headings used herein are for organizational purposes only and are not to be construed as limiting the subject matter described.

Exemplary embodiments of systems, methods, and techniques for structured illumination microscopy, including tilted structured illumination microscopy, are described below with reference to FIGS. 1, 2A-2D, and 3-6.

FIG. 1 shows a diagram of a system 100 for fluorescence imaging of a sample using structured illumination, in accordance with some embodiments. As described herein, system 100 may be used for tilted structured illumination microscopy. System 100 may be configured to generate a structured illumination light pattern, such as a tilted-SIM structured illumination light pattern, and to illuminate the sample with the structured illumination light pattern. A phase of all or part of the structured illumination light pattern may be controlled in order to apply one or more phase-steps to the pattern, and various images corresponding to different phases of the pattern and/or corresponding to different z-depths of the sample may be captured. The various images may then be processed (e.g., using a frequency domain reconstruction algorithm) to generate combined image data that provides improved axial resolution (e.g., a super-resolution image).

As shown, the system 100 includes a light source 102. In various embodiments, the light source 102 may include one or more suitable light sources, including one or more coherent light sources such as a laser light source. That is, light source 102 may represent multiple light sources, for example when light from separate light sources—e.g., having different wavelengths and/or different phases—is combined into a single beam. Light from light source 102 may be used to illuminate (e.g., to excite) a sample for fluorescence microscopy. The wavelength(s) of light source 102 may be selected and/or configured in accordance with the excitation wavelength of one or more fluorophores in the sample to be imaged by system 100, and/or in accordance with the structured illumination pattern to be generated, as described herein. The phase(s) for light source 102 may be selected and/or configured in accordance with the structured illumination pattern to be generated, as described herein.

Excitation light from light source 102 may be directed by one or more components of system 100 (e.g., one or more lenses, reflectors, beam-splitters, fibers, waveguides, or the like) to enter objective 110 and to thereafter be incident on substrate 112, on which the sample to be imaged may be disposed.

In the arrangement shown in FIG. 1, excitation light from light source 102 may pass through (and/or otherwise optically interact with) wave vector control device 104, which may include one or more components configured to generate the wave vectors (e.g., the exactly two wave vectors) used to form a structured illumination light pattern with which to excite the sample. For example, wave vector control device 104 may include a grating (e.g., a phase grating and/or a diffraction grating), a spatial light modulator (SLM), and/or one or more other components (e.g., mirrors, lenses, masks, electro-optical components) configured to generate the (exactly two) wave vectors of the structured illumination light pattern. Wave vector control device 104 may be disposed in one or both a sample conjugate plane and a pupil conjugate plane of the system (e.g., device 104 may span both the sample conjugate plane and the pupil conjugate plane); in some embodiments, device 104 may comprise an optical grating and/or a SLM in a sample conjugate plane of the system and may comprise a mask in a pupil conjugate plane of the system. Wave vector 104 may further be configured to include one or more components that are usable to shift the structured illumination light pattern. The structured illumination pattern may be shifted, for example, by an SLM and/or by an optical flat mounted on a galvanometer.

Downstream of wave vector control device 104, the excitation light may pass through lens 106 and may then be deflected by dichroic beam splitter 108 toward objective 110. Dichroic beam splitter 108 may be selected and/or configured to reflect light of the wavelength(s) of the excitation light emitted by light source 102.

After reflecting from dichroic beam splitter 108, the excitation light may travel toward and pass through objective 110. In some embodiments, objective 110 may be an immersion objective that is immersed in a transparent or translucent fluid between objective 110 and specimen substrate 112.

After passing through objective 110, the excitation light may travel toward and be incident upon substrate 112 and any sample disposed thereon. Sample substrate 112 may be any substrate configured to support or contain a sample to be imaged. In some embodiments, sample substrate 112 may comprise a microscopy slide, cover glass, or any other suitable substrate on which the sample to be imaged may be disposed.

A sample disposed on sample substrate 112 may be illuminated/excited by the excitation light, including by any structured light pattern defined by said excitation light. Thus, the sample may be illuminated/excited in a spatial pattern that is defined by the nodes of the structured light pattern. For example, the sample may be illuminated/excited in a spatial pattern such as one or more of the spatial patterns shown in FIG. 3. In particular, for a tilted-SIM pattern, the sample may be illuminated by a spatial pattern having the characteristics shown in the rightmost column in the first and second rows of FIG. 3. Such patterns may imparts spatial frequencies along the optical access of the system.

Following excitation of certain fluorophores in the sample by the spatial pattern, the fluorophores may fluoresce, emitting emission light of a wavelength that is dependent on the fluorophore(s) used. The emission light may travel from the sample toward and through objective 110.

After passing through objective 110, the emission light may travel toward and through dichroic beam splitter 108, which may be selected and/or configured to transmit light of the wavelength(s) of the emission light emitted by the fluorophores of the sample.

After passing through dichroic beam splitter 108 the emission light may travel toward and through lens 114 and may be collected by image sensor 116. In some embodiments, image sensor 116 may include any suitable image sensor for detecting the emission light, for example including one or more photodiode arrays, one or more CCD sensor or cameras, and/or one or more CMOS sensors or cameras. Image sensor 116 may collect the emission light and may generate digital image data. The digital image data may be stored locally and/or remotely, and may be transmitted in whole or in part to one or more image processing systems for image processing and/or analysis.

While the exemplary arrangement shown in FIG. 1 shows excitation light reflecting from a dichroic beam splitter and emission light passing through the dichroic beam splitter, other arrangements are possible in which excitation light passes through a dichroic beam splitter and emission light is reflected from the dichroic beam splitter. For example, the position of the lens 114/image sensor 116 can be switched with the position of the light source 102/wave vector control device 104/the excitation light may pass through lens 106/ first excitation light component 118/second excitation light component 120.

System 100 may be configured in some embodiments to apply a tilted-SIM illumination/excitation pattern that is not symmetrical about a center point of a back pupil of system 100, is based on exactly two wave vectors, and defines spatial frequencies along optical axis 122 of objective 110. An exemplary tilted-SIM illumination pattern having spatial frequencies along an optical axis of a system is shown in the rightmost column of FIG. 3. As shown in the rightmost column in the first row of FIG. 3, a tilted-SIM illumination pattern may define spatial frequencies along a "z axis" (e.g., an optical axis) of an objective of an imaging system, as shown by the diagonal lines of the interference pattern in the illustrated xz plane.

In some embodiments, system 100 may be configured to generate a tilted-SIM light pattern by using a spatial light modulator (e.g., included in wave vector control device 104), which may be positioned in a sample conjugate plane of system 100. The SLM can be used to both generate the spatial pattern and to phase-step the pattern between acquisition of different images. In addition to the SLM positioned in the sample conjugate plane, a mask may be used, for example by being positioned in a pupil conjugate plane of system 100, to remove unwanted diffraction orders. The mask may comprise one or more pinholes, or may comprise any other suitable design including one or more openings if any suitable shape and in any suitable pattern. This technique may be applicable in cases where light source 102 comprises a coherent source and/or an incoherent source, including for example an LED, a laser, and/or a halogen lamp.

In some embodiments, system 100 may be configured to generate a tilted-SIM light pattern by using a phase diffraction and/or a diffraction grating (e.g., included in wave vector control device 104), which may be positioned in a sample conjugate plane of system 100. One or more of said gratings may be mounted to a mechanism for controlling positioning in of the grating(s) along the x axis and/or they axis of the optical system (where the x and y axes are both perpendicular to an optical axis along which the excitation light propagates. Resolution characteristics for the one or more gratings may be selected and/or configured based on a magnification level of system 100. In addition to the one or more gratings positioned in the sample conjugate plane, a mask may be used, for example by being positioned in a pupil conjugate plane of system 100, to remove unwanted diffraction orders. The mask may comprise one or more pinholes, or may comprise any other suitable design including one or more openings if any suitable shape and in any suitable pattern. This technique may be applicable in cases where light source 102 comprises a coherent source and/or an incoherent source, including for example an LED, a laser, and/or a halogen lamp.

In some embodiments, system 100 may be configured to generate a tilted-SIM light pattern by using two separate laser light components, either generated by separate laser light sources or generated by a single laser light source and split into two components. The two laser light components may be configured such that the phase of one or more component beams can be independently controlled. For example, one or both beams may be controllable by a physical delay, a phase retarder (e.g., an electro-optical retarder), or both. Both of the laser light components may be directed into objective 110 such that the two components are focused, with controllable angles, onto different areas of the back pupil of objective 110. For example, one of the two components may be focused into a center of the back pupil of objective 110, while another component may be focused onto an area near a periphery of the back pupil of objective 110. In the example shown in FIG. 1, first excitation light component 118 is focused into a center of the back pupil of objective 110, while second excitation light component 120 is focused onto an area near a periphery of the back pupil of objective 110. In some embodiments, the peripheral beam may be rotated around the edge of the back pupil. For example, in instances in which a grating is used to generate the two beams, the grating may be rotated, and a mask that blocks some of the beams generated by the grating (while allowing the peripheral beam to pass) may be co-rotated with the grating. While the description herein contemplates that this method using two illumination components be carried out using coherent light sources (e.g., lasers), in some embodiments one or more incoherent light sources (e.g., LED, halogen lamp) may be used to generate one or both of the excitation light components. In various embodiments, a first structured illumination pattern may be provided through the center point of the objective back pupil. In various embodiments, a second structured illumination pattern may be provided offset from the center point of the objective back pupil. In various embodiments, a tilt mirror may be actuated to provide the structured illumination pattern through the objective at a position that is offset from the center point of the objective back pupil.

Regardless of which physical arrangement is used (e.g., whether a SLM or an optical grating is used), the system may be configured to generate and phase-step the tilted-SIM pattern (e.g., by varying the phase of the all or part of the tilted-SIM pattern) and to collect one or more images corresponding each phase-step. This process may be repeated to collect one or more images for each of a plurality of z-planes in which the sample is imaged. A plurality of the collected images of the different z-planes may then be used to generate combined image data (e.g., a super-resolution image) that provides optical sectioning and improved axial resolution as described herein.

FIGS. 2A-2D show respective diagrams of wave vectors and optical transfer functions for various types of structured illumination microscopy, in accordance with some embodiments. Each of the various types of structured illumination microscopy shown in FIGS. 2A-2D may, in some embodiments, be implemented by system 100.

Figures 2A, 2B:
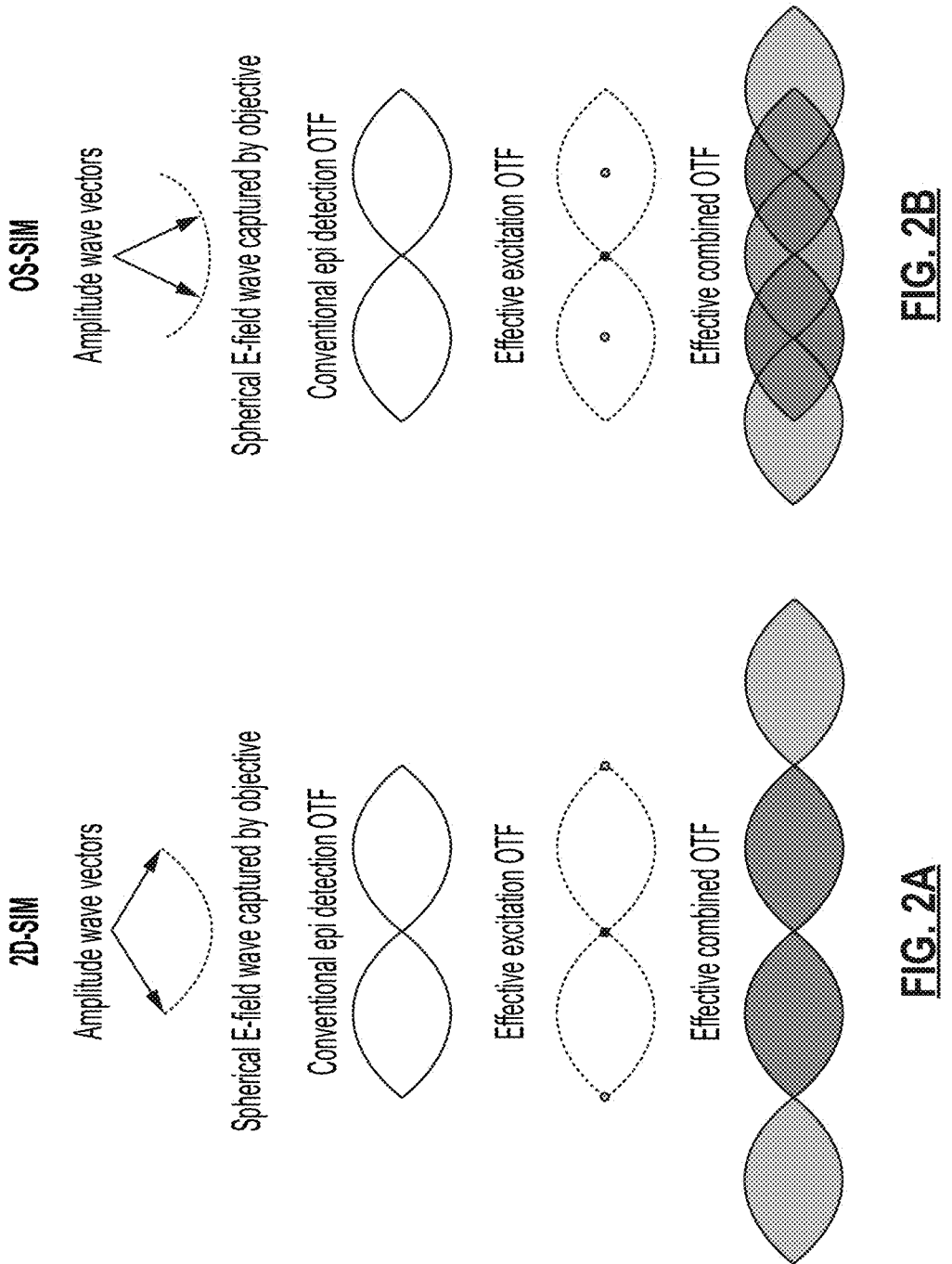
FIGS. 2A-2D show respective diagrams of wave vectors and optical transfer functions (OTFs) for various types of structured illumination microscopy, in accordance with some embodiments.

FIG. 2A shows diagrams for two-dimensional structured illumination microscopy (2D-SIM). As shown, for 2D-SIM, two amplitude wave vectors may be used to generate an effective combined OTF as shown. Compared to conventional epifluorescent microscopy, a fluorescent microscope using 2D-SIM may have double the lateral resolution, but may have no added axial resolution and no optical sectioning (the missing cone is not filled in). Implementation of 2D-SIM may require capturing nine times more images compared to conventional epifluorescent microscopy (thereby introducing a nine-fold reduction in throughput).

FIG. 2B shows diagrams for optical-sectioning structured illumination microscopy (OS-SIM). As shown, for OS-SIM, two amplitude wave vectors may be used to generate an effective combined OTF as shown. Compared to conventional epifluorescent microscopy, a fluorescent microscope using OS-SIM may have 1.5 times the lateral resolution and optical sectioning (filling in the missing cone). However, OS-SIM does not add axial resolution. Implementation of OS-SIM may require capturing nine times more images compared to conventional epifluorescent microscopy (thereby introducing a nine-fold reduction in throughput) if optical sectioning and a lateral resolution increase is to be yielded. If only optical sectioning is to be yielded, with no increase in lateral resolution, then implementation of OS-SIM may require capturing three times more images compared to conventional epifluorescent microscopy (thereby introducing a threefold reduction in throughput).

Figures 2C, 2D:
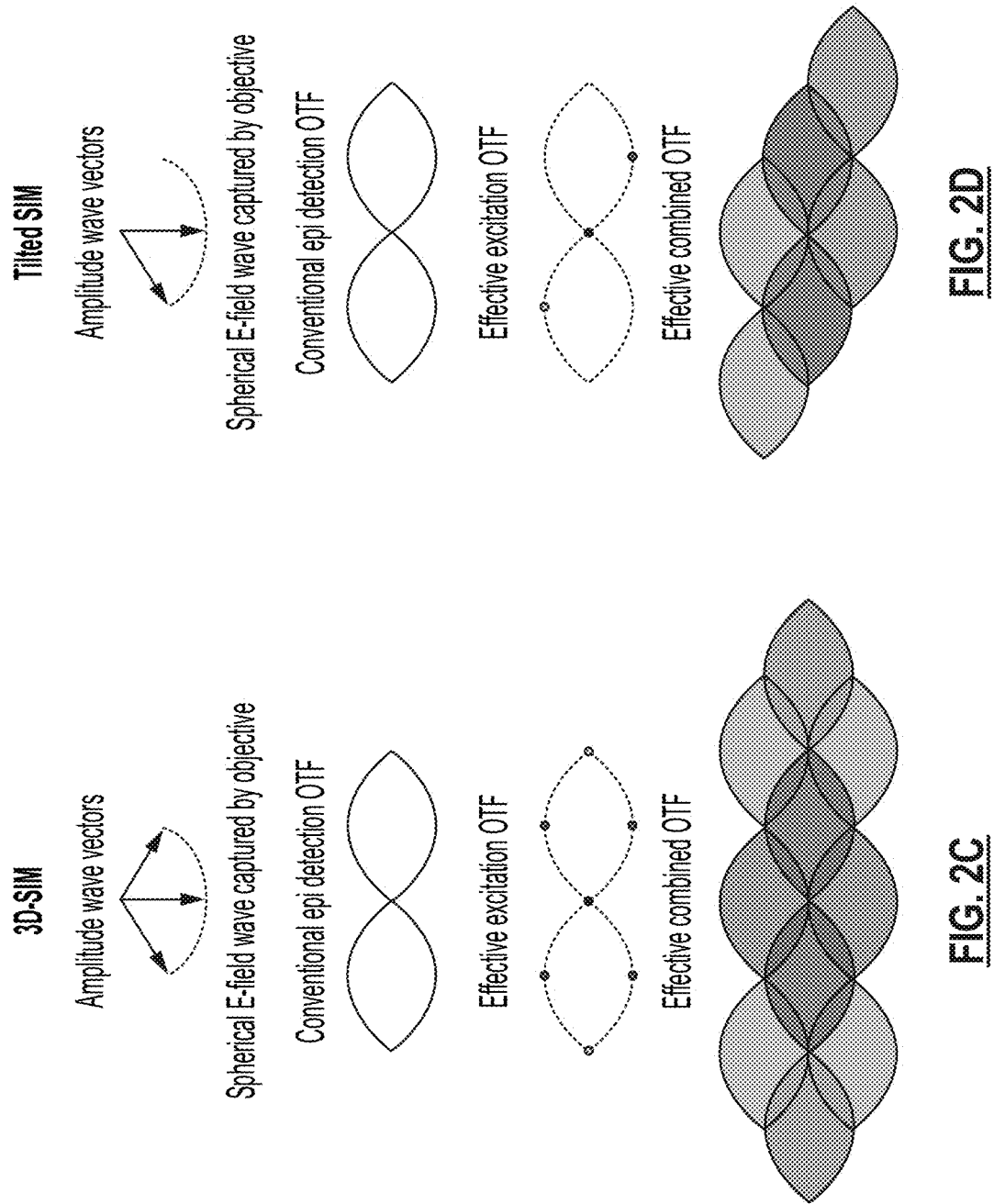

FIG. 2C shows diagrams for three-dimensional structured illumination microscopy (3D-SIM). As shown, for 3D-SIM, three amplitude wave vectors may be used to generate an effective combined OTF as shown. Compared to conventional epifluorescent microscopy, a fluorescent microscope using 3D-SIM may have double the lateral resolution, double the axial resolution, and may have complete optical sectioning (the missing cone is filled in). Implementation of 3D-SIM may require capturing 30 times more images compared to conventional epifluorescent microscopy (thereby introducing a thirty-fold reduction in throughput). In 3D-SIM, an image may be required for each unique combination of a given orientation given pair of extension OTFs (e.g., a given phase used). For 3D-SIM, there are five phases and three orientations, so 15 images may be required. Accounting for the need for double sampling in z, 30 images may be required.

FIG. 2D shows diagrams for tilted structured illumination microscopy (tilted-SIM). As shown, for tilted-SIM, two amplitude wave vectors may be used to generate an effective combined OTF as shown. Compared to conventional epifluorescent microscopy, a fluorescent microscope using tilted-SIM may have double the axial resolution, while no increase in lateral resolution is achieved. Optical sectioning may be added (the missing cone is filled in) that is better than confocal, ApoTome, and OS-SIM optical sectioning. Implementation of tilted-SIM may require capturing six times more images compared to conventional epifluorescent microscopy (thereby introducing a six-fold reduction in throughput). The six images that may be required for 3D-SIM may be required because, if only a single orientation is used, only one image per extension OTF (e.g., for each phase) is needed. Thus, if three phases are used, and double sampling in z is used, then only six total images may be required. (In some embodiments, additional orientations may be used. For example, if three orientations are used then 18 images may be required.)

Nominal axial resolution of an objective may be given by the expression:

$$\frac{\lambda}{n - \sqrt{n^2 - (NA)^2}} \tag{1}$$

which is based on the theoretical extent of the optical transfer function. In the expression above, $\lambda$ is the wavelength of the light used for imaging, n is the refractive index of the medium between the objective and the sample, and NA is the numerical aperture of the objective. Alternately, nominal axial resolution of an objective may be given by the first term of the Taylor expansion of expression (1) expression, which is:

$$\frac{2n\lambda}{(NA)^2} \tag{2}$$

Because tilted-SIM imaging as described herein may result in double the axial resolution as compared to conventional epifluorescent microscopy, the axial resolution for tilted-SIM imaging may be given by:

$$\frac{\lambda}{2\left(n - \sqrt{n^2 - (NA)^2}\right)} \tag{3}$$

or by:

$$\frac{n\lambda}{(NA)^2} \tag{4}$$

Tilted-SIM fluorescence imaging may be particularly-well suited for in situ applications that use amplification, because, in such applications, the lateral resolution of a microscopy—even using standard microscopy—may be sufficient to resolve the spots, which may be larger than the diffraction limit of the microscope in the lateral plane. However, the spots in such an application may be subdiffractive axially. Thus, an approach that improves axial resolution—without further reducing throughput in order to unnecessarily improve lateral resolution—may be beneficial. Using tilted-SIM imaging for in situ applications may thus make post-processing easier (due to improved axial resolution and optical sectioning), and may also allow for successful imaging of samples with significantly increased spot density (e.g., in samples with highly expressed genes).

Figure 3:
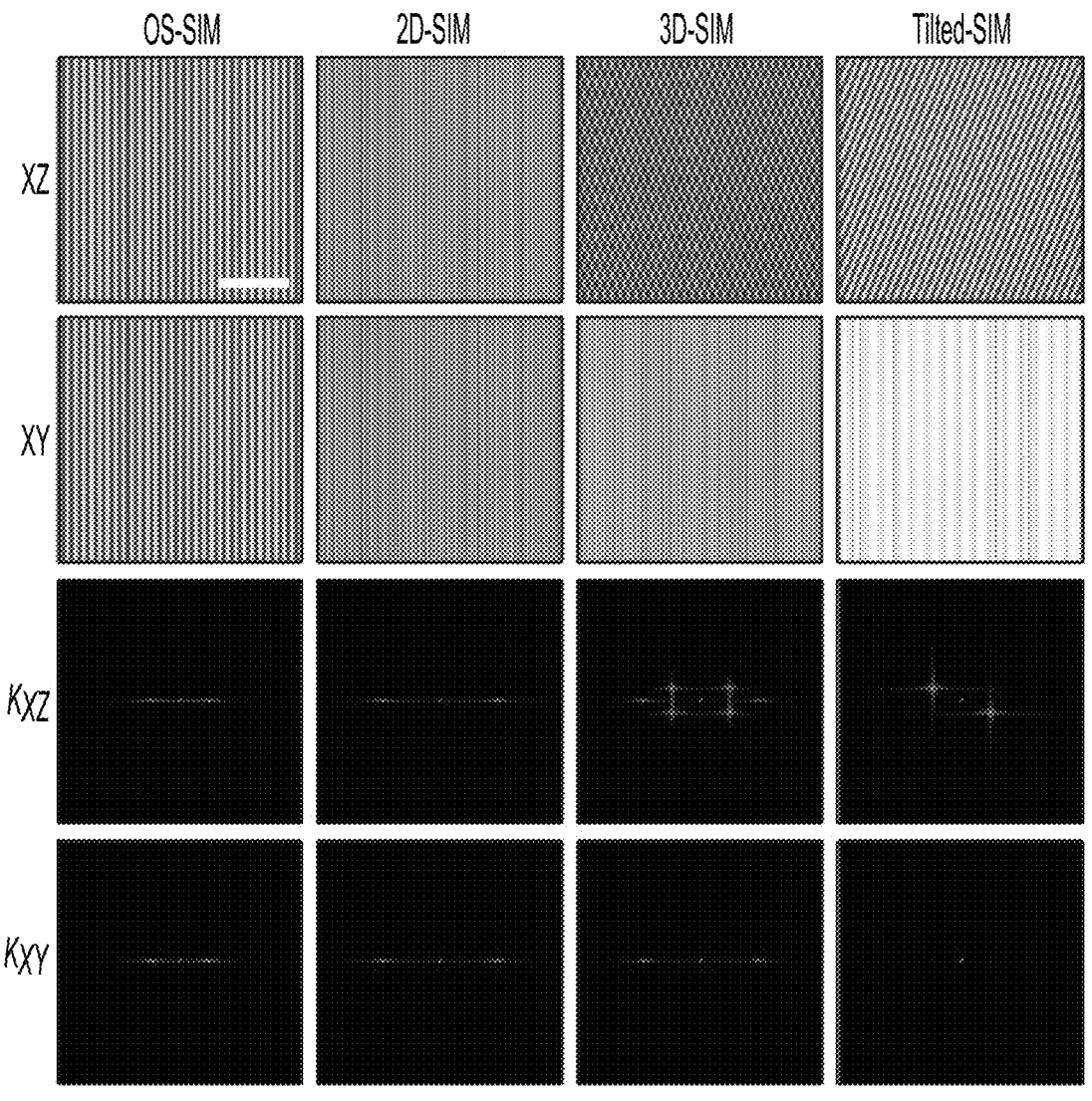
FIG. 3 shows illumination patterns and effective excitation OTFs for various types of structured illumination microscopy, in accordance with some embodiments.

FIG. 3 shows illumination patterns and effective excitation OTFs for various types of structured illumination microscopy, in accordance with some embodiments.

The first (leftmost) column corresponds to OS-SIM (e.g., as described above with reference to FIG. 2B), the second column corresponds to 2D-SIM (e.g., as described above with reference to FIG. 2A), the third column corresponds to 3d-SIM (e.g., as described above with reference to FIG. 2C), and the fourth column corresponds to tilted-SIM (e.g., as described above with reference to FIG. 2D).

The first (topmost) row shows a representation of the structured illumination light pattern in an xz plane of an imaging system, wherein the z direction corresponds to an optical axis of an objective of the system. The second row shows a representation of the structured illumination light pattern in an xy plane of the imaging system, wherein the x and y directions are each perpendicular to the z direction of the optical axis of the objective of the system.

As shown for tilted-SIM, the structured illumination light for tilted-SIM imparts spatial frequencies along the z axis, and is asymmetrical in the xy plane (as shown by the diagonal lines in the xy plane).

The third row in FIG. 3 shows representations of effective excitation OTFs in the $k_{xz}$ plane. The fourth row in in FIG. 3 shows representations of effective excitation OTFs in the $k_{xy}$ plane. It should be noted that the dots shown in the third and fourth rows of FIG. 3 are not in the $k_z=0$ plane.

Figure 4:
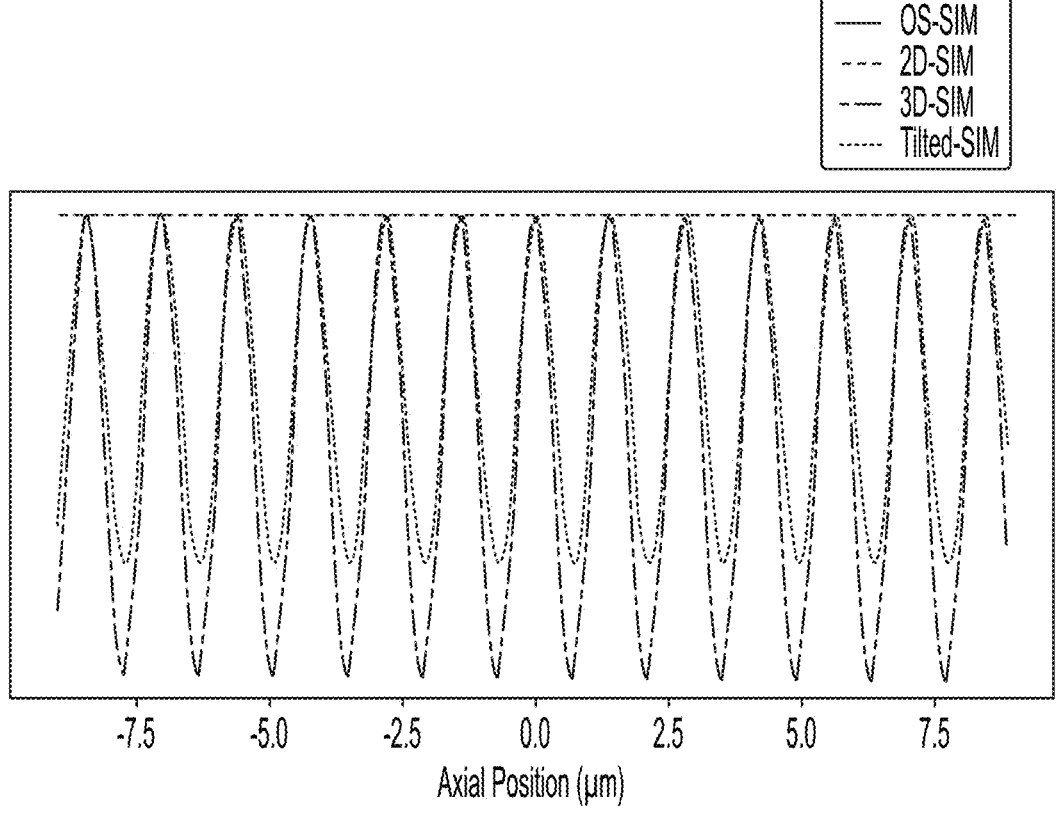
FIG. 4 shows axial modulation for various types of structured illumination microscopy, in accordance with some embodiments.

FIG. 4 shows axial modulation for various types of structured illumination microscopy, in accordance with some embodiments. As shown, the modulation depth (height) for 3D-SIM is better than for tilted-SIM, which means a better signal-to-noise ratio may be needed for tilted-SIM than for 3D-SIM in order to achieve good reconstruction.

Figure 5:
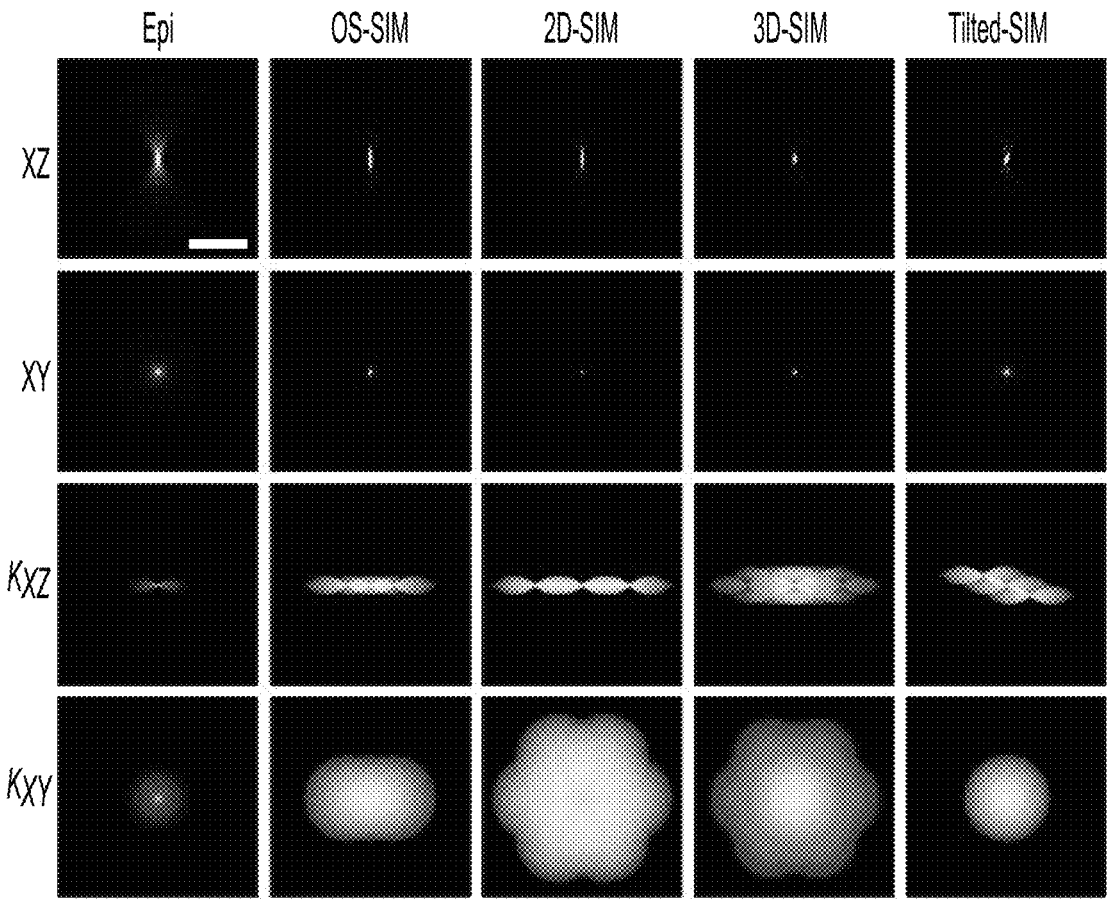
FIG. 5 shows point spread functions and optical transfer functions for various types of structured illumination microscopy, in accordance with some embodiments.

FIG. 5 shows point spread functions and optical transfer functions for various types of structured illumination microscopy, in accordance with some embodiments. The first (leftmost) column corresponds to epifluoresncent microscopy, the second column corresponds to OS-SIM (e.g., as described above with reference to FIG. 2B), the third column corresponds to 2D-SIM (e.g., as described above with reference to FIG. 2A), the fourth column corresponds to 3d-SIM (e.g., as described above with reference to FIG. 2C), and the fifth column corresponds to tilted-SIM (e.g., as described above with reference to FIG. 2D).

The first (topmost) row shows simulated point spread functions in an xz plane of an imaging system, wherein the z direction corresponds to an optical axis of an objective of the system. The second row shows simulated point spread functions in an xy plane of the imaging system, wherein the x and y directions are each perpendicular to the z direction of the optical axis of the objective of the system. The third row shows simulated optical transfer functions in the $k_{xz}$ plane of an imaging system. The fourth row shows optical transfer functions in the $k_{xy}$ plane of the imaging system.

Figure 6:
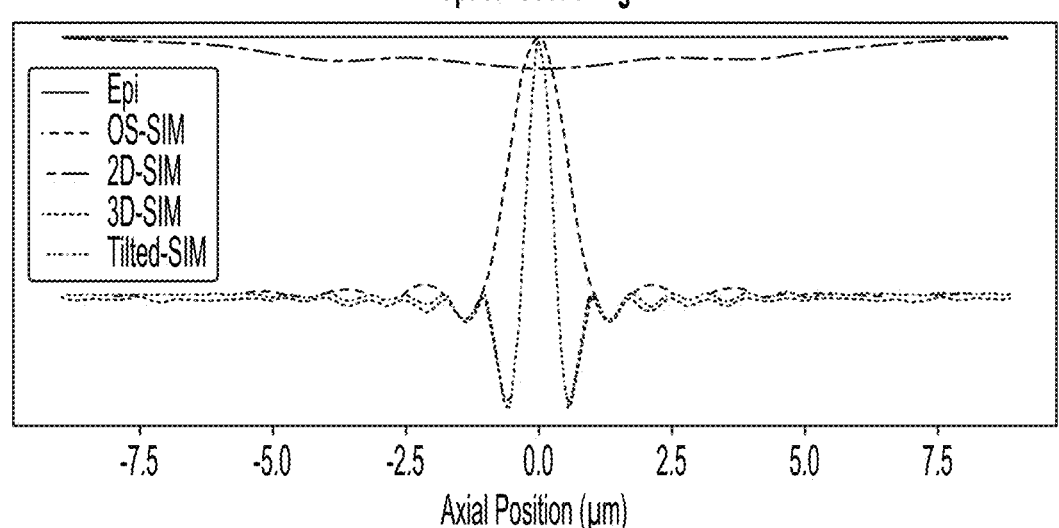
FIG. 6 shows optical sectioning for various types of structured illumination microscopy, in accordance with some embodiments.

FIG. 6 shows optical sectioning for various types of structured illumination microscopy, in accordance with some embodiments. Specifically, the plot in FIG. 6 shows integrated power as a function of axial position. As shown, the integrated power curve for 3D-SIM and tilted-SIM have a narrower FWHM than is achieved by OS-SIM. The FWHM of an integrated power curve against axial position for tilted-SIM may, in some embodiments, be less than or equal to 95%, 90%, 85%, 80%, 70%, 60%, or 50% the FWHM of an integrated power curve against axial position for OS-SIM achieved using an imaging system that is otherwise configured in the same manner.

Figure 7:
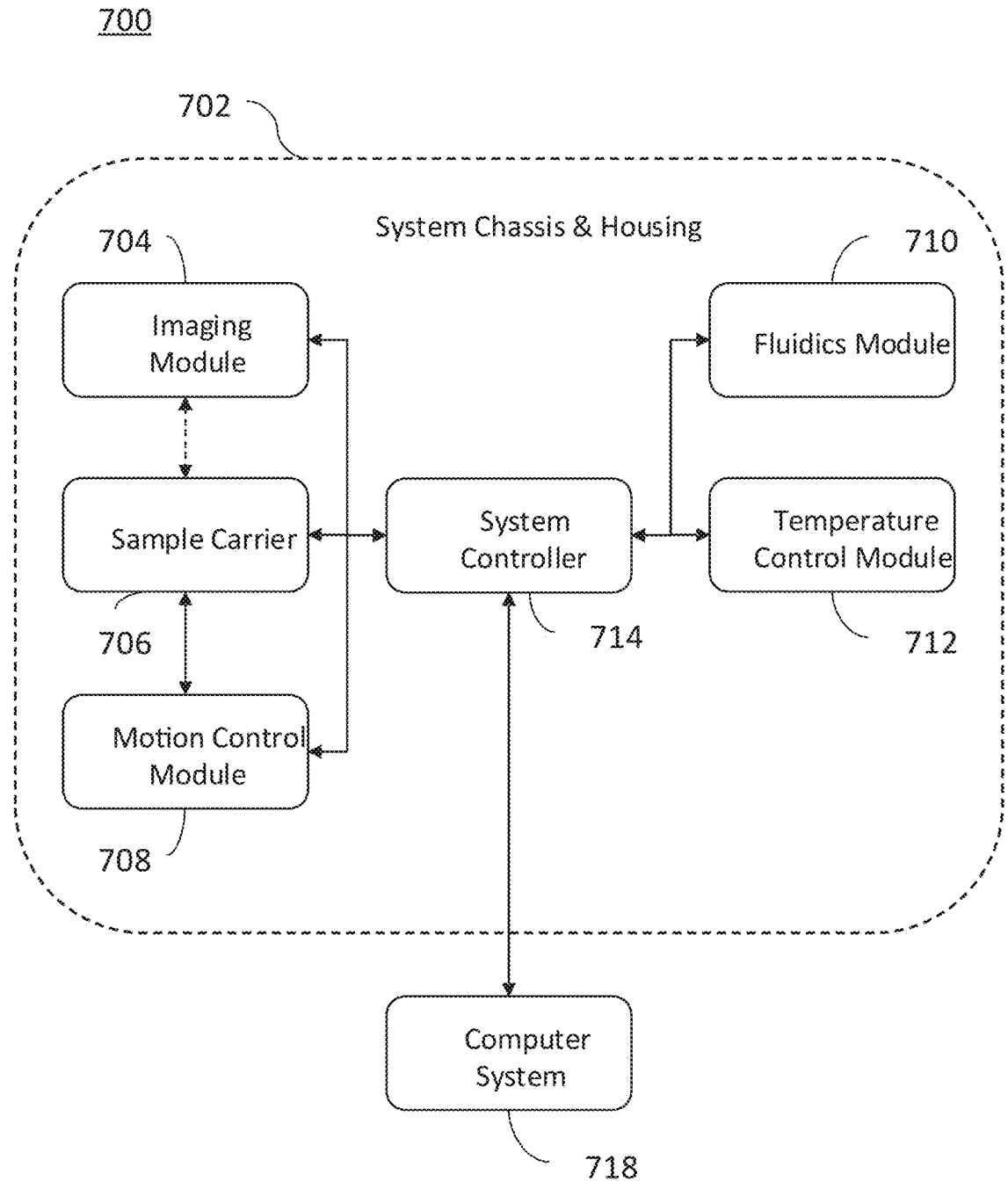
FIG. 7 shows a schematic diagram of a system configured to implement the methods disclosed herein, in accordance with some embodiments.

FIG. 7 shows a schematic diagram of a system configured to implement the methods disclosed herein, in accordance with some embodiments.

As illustrated schematically in FIG. 7, a system 700 configured to implement the methods disclosed herein may comprise one or more imaging modules 704 (e.g., one or more commercial imaging instruments and/or one or more custom imaging modules), one or more additional processors or system controllers 714 (e.g., computers or computer systems), one or more sample carriers 706, one or more fluidics modules 710, one or more temperature control modules 712, one or more motion control modules 708 (which may comprise one or more translation and/or rotation stages), one or more system control software packages, one or more data analysis (e.g., image processing) software packages, or any combination thereof. In some instances, the system may comprise an integrated system, e.g., where the different functional subsystems are mounted on a single framework or chassis, and packaged within a single housing 702. In some instances, the system may comprise a modular system, e.g., where the different functional subsystems are mounted on separate frameworks or chassis, and packaged in separate housings. In some instances, the one or more system controllers 714 may interface with an external computer system 716.

Commercial optical imaging instruments: In some instances, the disclosed methods may utilize a commercial optical imaging instrument for detection and readout, e.g., a commercial fluorescence microscope or a fluorescence imaging microplate reader. Examples of suitable fluorescence microscopes include, but are not limited to, the Zeiss Axioscope 5 multichannel fluorescence microscope (Carl Zeiss Microscopy, LLC, White Plains, N), the Olympus BX63 automated fluorescence microscope (Olympus Scientific Solutions Americas Corp., Waltham, MA), and the Nikon Eclipse Ti2 fluorescence microscope (Nikon Instruments, Inc., Melville, NY). Examples of fluorescence imaging microplate readers include, but are not limited to, the Tecan Spark® Cyto multimode microplate reader (Tecan SP, Inc., Baldwin Park, CA) and the Molecular Devices SpectraMax i3x multimode microplate reader (Molecular Devices, San Jose, CA).

Custom optical imaging modules: In some instances, the disclosed methods may utilize a custom optical imaging instrument for detection and readout, e.g., a custom fluorescence imaging module (or fluorescence imaging unit), which may comprises one or more light sources, one or more objective lenses, one or more sample carriers (e.g., sample holders, sample stages, and/or translation stages), one or more tube lenses, one or more image sensors or cameras, one or more processors or controllers, one or more additional optical components (e.g., lenses, mirrors, prisms, beamsplitters, optical filters, colored glass filters, narrowband interference filters, broadband interference filters, dichroic reflectors, diffraction gratings, apertures, shutters, optical fibers, optical waveguides, acousto-optic modulators, and the like), or any combination thereof. In some instances, the custom imaging module may comprise a focus mechanism, e.g., an autofocus mechanism. In some instances, the custom imaging module may be configured to perform multichannel imaging, e.g., multichannel fluorescence imaging comprising the use of excitation light at one or more excitation wavelengths, and imaging the emitted fluorescence at two or more different emission wavelengths.

Objective lenses: The custom imaging modules disclosed herein, e.g., fluorescence imaging modules, may comprise one or more objective lenses of the same type or of different types. Examples of suitable objective lenses include, but are not limited to, low magnification objectives (e.g., 5× and 10× objectives), intermediate magnification objectives (e.g., 20× and 50× objectives), high magnification objectives (e.g., 100× objectives), designed to work with any suitable immersion media, including but not limited to, dry objectives, water immersion objectives, oil immersion objectives, cover slip-corrected objectives, infinity-corrected objectives, achromatic objectives, plan achromatic objectives, fluorite (or semi-apochromatic) objectives, plan fluorite objectives, and plan apochromatic objectives. In some instances, the one or more objective lenses may comprise objectives of a custom design that exhibit a specified magnification, numerical aperture, working distance, focal distance, etc., or any combination thereof.

In some instances, the one or more objective lenses may be fixed components of the imaging module. In some instances, the one or more objective lenses may be moveable (or replaceable) components of the imaging module, e.g., by mounting them on a rotatable turret, mounting them on a translatable slide or stage, etc. In some instances, the one or more objective lenses may comprise both fixed and moveable (or replaceable) components of the imaging module.

Objective lens magnification: In some instances, the magnification of the one or more objective lenses may be the same or may be different, and may range from about 2× to about 100×. In some instances, the magnification of the one or more objective lenses may be at least 2×, at least 5×, at least 10×, at least 15×, at least 20×, at least 25×, at least 30×, at least 35×, at least 40×, at least 45×, at least 50×, at least 60×, at least 70×, at least 80×, at least 90×, or at least 100×. In some instances, the magnification of the one or more objective lenses may be at most 100×, at most 90×, at most 80×, at most 70×, at most 60×, at most 50×, at most 45×, at most 40×, at most 35×, at most 30×, at most 25×, at most 20×, at most 15×, at most 10×, at most 5×, or at most 2×. Any of the lower and upper values described in this paragraph may be combined to form a range included within the present disclosure, for example, in some instances the magnification of the one or more objective lenses may range from about 5× to about 25×. Those of skill in the art will recognize that the magnification of the one or more objective lenses may have any value within this range, e.g., about 7.5×.

Objective focal length: In some instances, the focal length of the one or more objective lenses may be the same or may be different, and may range between 20 mm and 200 mm. In some instances, the focal length of the one or more objective lenses may be at least 20 mm, at least 25 mm, at least 30 mm, at least 35 mm, at least 40 mm, at least 50 mm, at least 60 mm, at least 70 mm, at least 80 mm, at least 90 mm, at least 100 mm, at least 120 mm, at least 140 mm, at least 160 mm, at least 180 mm, or at least 200 mm. In some instances, the focal length of the one or more objective lenses may be at most 200 mm, at most 180 mm, at most 160 mm, at most 140 mm, at most 100 mm, at most 90 mm, at most 80 mm, at most 70 mm, at most 60 mm, at most 50 mm, at most 40 mm, at most 35 mm, at most 30 mm, at most 25 mm, or at most 20 mm. Any of the lower and upper values described in this paragraph may be combined to form a range included within the present disclosure, for example, in some instances the focal length of the one or more objective lenses may range from 25 mm to 120 mm. Those of skill in the art will recognize that the focal length of the one or more objective lenses may have any value within the range of values specified above, e.g., about 65 mm.

Objective working distance: In some instances, the working distance of the one or more objective lenses may be the same or may be different, and may range between about 100 μm and 30 mm. In some instances, the working distance may be at least 100 μm, at least 200 μm, at least 300 μm, at least 400 μm, at least 500 μm, at least 600 μm, at least 700 μm, at least 800 μm, at least 900 μm, at least 1 mm, at least 2 mm, at least 4 mm, at least 6 mm, at least 8 mm, at least 10 mm, at least 15 mm, at least 20 mm, at least 25 mm, or at least 30 mm. In some instances, the working distance may be at most 30 mm, at most 25 mm, at most 20 mm, at most 15 mm, at most 10 mm, at most 8 mm, at most 6 mm, at most 4 mm, at most 2 mm, at most 1 mm, at most 900 μm, at most 800 μm, at most 700 μm, at most 600 μm, at most 500 μm, at most 400 μm, at most 300 μm, at most 200 μm, at most 100 μm. Any of the lower and upper values described in this paragraph may be combined to form a range included within the present disclosure, for example, in some instances the working distance of the objective lens may range from 500 μm to 2 mm. Those of skill in the art will recognize that the working distance of the objective lens may have any value within the range of values specified above, e.g., about 1.25 mm.

Objective numerical aperture: In some instances, the numerical aperture of the one or more objective lenses may be the same or may be different, and may range from about 0.1 to about 1.4. In some instances, the numerical aperture may be at least 0.1, at least 0.2, at least 0.3, at least 0.4, at least 0.5, at least 0.6, at least 0.7, at least 0.8, at least 0.9, at least 1.0, at least 1.1, at least 1.2, at least 1.3, or at least 1.4. In some instances, the numerical aperture may be at most 1.4, at most 1.3, at most 1.2, at most 1.1, at most 1.0, at most 0.9, at most 0.8, at most 0.7, at most 0.6, at most 0.5, at most 0.4, at most 0.3, at most 0.2, or at most 0.1. Any of the lower and upper values described in this paragraph may be combined to form a range included within the present disclosure, for example, in some instances the numerical aperture may range from about 0.1 to about 0.6. Those of skill in the art will recognize that the numerical aperture may have any value within this range, e.g., about 0.55.

Tube lenses: In some instances, the imaging module may comprise one or more tube lenses, e.g., lenses positioned in the optical path between an objective lens (e.g., an infinity-corrected objective) and an image sensor to collimate and/or focus the light transmitted by the objective and form an image on the image sensor. In some instances, the one or more tube lenses may comprise fixed components of the imaging module. In some instances, the one or more tube lenses may be moveable (or replaceable) components of the imaging module, e.g., by mounting them on a rotating stage, mounting them on a translatable slide or stage, etc. In some instances, the one or more tube lenses may comprise both fixed and moveable (or replaceable) components of the imaging module.

Tube lens focal length: In some instances, the focal length for the one or more tube lenses may be the same or may be different, and may be at least 100 mm, at least 120 mm, at least 140 mm, at least 180 mm, at least 200 mm, at least 220 mm, at least 240 mm, at least 260 mm, at least 280 mm, at least 300 mm, at least 400 mm, at least 500 mm, or at least 600 mm.

Image sensors: In some instances, the imaging module may comprise one or more image sensors (or cameras) that may be the same or may be different, and may include any of a variety of image sensors including but not limited to, photodiode arrays, charge-coupled device (CCD) sensors or cameras, or complementary metal-oxide-semiconductor (CMOS) image sensors or cameras. In some instances, the one or more image sensors may comprise one-dimensional (linear) or two-dimensional pixel array sensors. In some instances, the one or more image sensors may comprise monochrome image sensors (e.g., configured to capture greyscale images) or color image sensors (e.g., configured to capture RGB or color images).

Image sensor pixel count: In some instances, the pixel count for the one or more image sensors may be the same or different, and may vary in terms of pixel size and pixel count. In some instances, the image resolution may depend on the pixel size and pixel count of the image sensors used. In some instances, the one or more image sensors may have a pixel count of at least 0.5 megapixels, at least 1 megapixels, at least 5 megapixels, at least 10 megapixels, at least 15 megapixels, at least 20 megapixels, at least 30 megapixels, at least 40 megapixels, at least 50 megapixels, at least 75 megapixels, at least 100 megapixels, at least 200 megapixels, at least 500 megapixels, or at least 1,000 megapixels.

Image sensor pixel size and pitch: In some instances, the pixel size and/or pitch selected for the one or more image sensors may be the same or different, and may range from about 0.1 μm to about 10 μm in at least one dimension. In some instances, the pixel size and/or pitch may be at least 0.1 μm, at least 0.5 μm, at least 1 μm, at least 2 μm, at least 3 μm, at least 4 μm, at least 5 μm, at least 6 μm, at least 7 μm, at least 8 μm, at least 9 μm, or at least 10 μm. In some instances, the pixel size and/or pitch may be at most 10 μm, at most 9 μm, at most 8 μm, at most 7 μm, at most 6 μm, at most 5 μm, at most 4 μm, at most 3 μm, at most 2 μm, at most 1 μm, at most 0.5 μm, or at most 0.1 μm. Any of the lower and upper values described in this paragraph may be combined to form a range included within the present disclosure, for example, in some instances the pixel size and/or pitch may range from about 3 μm to about 9 μm. Those of skill in the art will recognize that, in some instances, the pixel size and/or pitch may have any value within this range, e.g., about 1.4 μm.

Image sensor downsampling: In some instances, the images acquired by the one or more image sensors may be downsampled (either on-chip or through post-acquisition image processing) to reduce the image lateral resolution and/or image file size while keeping the same two-dimensional representation (or field-of-view) of the image. In some instances, the downsampled image may have a lateral resolution that is at least 2-fold, 4-fold, 6-fold, 8-fold, 10-fold, 12-fold, 14-fold, 16-fold, 18-fold, or 20-fold lower than the lateral resolution of an image acquired at full image sensor resolution. Examples of on-chip image downsampling techniques include, but are not limited to, image sensor pixel binning. Examples of image processing-based image downsampling techniques include, but are not limited to, direct downsampling, wavelet transformations, and discrete cosine transforms (see, e.g., Zhang, et al. (2011), "Interpolation-Dependent Image Downsampling", *IEEE Transactions On Image Processing,* 20(11):3291-3296; Jagadeesan, et al. (2014), "An Efficient Image Downsampling Technique Using Genetic Algorithm and Discrete Wavelet Transform", *Journal of Theoretical and Applied Information Technology* 61(3):506-514).

Acquiring a series of images: In some instances, the one or more image sensors may be used to capture single images, e.g., a single image for each decoding cycle of a plurality of decoding cycles used to decode a set of barcoded analytes. In some instances, the one or more image sensors may be used to capture a series of images, e.g., a series of images during each decoding cycle of a plurality of decoding cycles used to decode a set of barcoded analytes. In some instances, a series of images may comprise images (or video frames) that correspond to images captured before, during, and/or after an event, e.g., before, during, and/or after addition of a barcode probe to a sample being imaged. In some instances, a series of images may comprise at least 2 images, at least 3 images, at least 4 images, at least 5 images, at least 10 images, at least 20 images, at least 30 images, at least 40 images, at least 50 images, at least 100 images, at least 200 images, at least 300 images, at least 400 images, at least 500 images, at least 1,000 images, or more than 1,000 images.

Imaging frame rate: In some instances, the one or more image sensors may capture a series of images (or "frames") at a predefined image acquisition rate (or frame rate). For example, in some instances, the image acquisition rate may range from about 0.01 frames per second to about 1,000 frames per second. In some instances, the image acquisition rate may be at least 0.01 frames per second, at least 0.1 frames per second, at least 1.0 frames per second, at least 10 frames per second, at least 100 frames per second, or at least 1,000 frames per second.

Light sources: In some instances, the imaging module may comprise one or more light sources. Examples of light sources include, but are not limited to, tungsten lamps, tungsten-halogen lamps, arc lamps, lasers, light emitting diodes (LEDs), or laser diodes. In some instances, the one or more light sources may produce continuous wave, pulsed, Q-switched, chirped, frequency-modulated, and/or amplitude-modulated light at a specified wavelength (or within a specified wavelength bandpass) defined by the light source alone or in combination with one or more optical filters (e.g., one or more colored glass filters, narrowband interference filters, broadband interference filters, dichroic reflectors, diffraction gratings, etc.).

Imaging module image acquisition mode: In some instances, the imaging module may be configured to acquire images in any of a variety of imaging modes. Examples include, but are not limited to, bright-field, dark-field, fluorescence, phase contrast, or differential interference contrast (DIC), and the like, where the combination of magnification and contrast mechanism provides images having cellular or sub-cellular image resolution. In some instances, the imaging module may be configured to perform wide-field microscopic imaging (see, e.g., Combs, et al. (2017), "Fluorescence Microscopy: A Concise Guide to Current Imaging Methods", *Current Protocols in Neuroscience* 79, 2.1.1-2.1.25). In some instances, the imaging module may be configured to perform volumetric imaging (or optical sectioning) using camera-based approaches (e.g., scanned focus imaging, multi-focus imaging, extended focus imaging, etc.) or scanning-based approaches (e.g., fast three-dimensional scanning) (see, e.g., Mertz (2019), "Strategies for Volumetric Imaging with a Fluorescence Microscope", *Optica* 6(10): 1261-1268). In some instances, the optical imaging module may be configured to perform optical sectioning using light sheet microscopy (see, e.g., Combs, et al. (2017), ibid.; Power, et al. (2017), "A Guide to Light-Sheet Fluorescence Microscopy for Multiscale Imaging", *Nature Methods* 14(4):360-373).

Wide-field microscopic imaging: In some instances, the imaging module (or system comprising the imaging module) may be configured to perform wide-field microscopic imaging (e.g., epi-fluorescence microscopic imaging). Used in combination with large format cameras having high sensitivity, high dynamic range, low noise characteristics, and fast frame rates, wide-field microscopy enables fast image acquisition and good contrast at low signal levels while offering diffraction-limited (or near-diffraction-limited) spatial (lateral) resolution over large fields of view (Combs, et al. (2017), ibid.).

Volumetric imaging: In some instances, the imaging module (or system comprising the imaging module) may be configured to perform volumetric imaging (or optical sectioning). In some instances, the imaging comprises acquisition of a plurality (or "stack") of two-dimensional (2D) images to form a three-dimensional (3D) representation of the sample, where each two-dimensional image is aligned with the other images of the plurality in the sample plane (e.g., the X-Y plane), but is offset from the other two-dimensional images in a direction parallel to the optical axis of the imaging module (e.g., in the Z-direction). In some instances, the stack of images may be acquired sequentially. In some instances, the stack of images may be acquired simultaneously. In some instances, the depth-of-field of the imaging module (i.e., the distance in the Z-direction between the nearest and the farthest points that are in acceptably sharp focus in an image) may be about equal to, or smaller than, the offset (or "step size") in the Z-direction between adjacent two-dimensional images of the stack. In some instances, the depth-of-field of the two-dimensional images may be adjusted by, e.g., adjusting the numerical aperture and/or focal length of the objective lens and/or tube lens.

Light sheet microscopy: In some instances, the imaging module (or system comprising the imaging module) may be configured to perform light sheet microscopy (e.g., light sheet fluorescence microscopy (LSFM)). In LSFM, for example, excitation light is delivered in the form of a thin sheet of laser light, and emitted light is collected in an orthogonal direction, using two perpendicular objective lenses (Combs, et al. (2017), ibid.). Fluorescence is excited by the light sheet and originates from a single plane in the sample. The light sheet is then scanned relative to the sample (or the sample is scanned relative to the light sheet) to build up a volumetric image.

Imaging module compound magnification: In some instances, the compound magnification of the imaging module (i.e., the effective magnification resulting from a combination of lenses (e.g., an objective lens, tube lens, and/or additional lenses) may range from about 40× to about 1000×. In some instances, the compound magnification of the imaging module may be at least 40×, at least 50×, at least 60×, at least 70×, at least 80×, at least 90×, at least 100×, at least 200×, at least 300×, at least 400×, at least 500×, at least 600×, at least 700×, at least 800×, at least 900×, or at least 1000×. In some instances, the compound magnification of the imaging module may be at most 1000×, at most 900×, at most 800×, at most 700×, at most 600×, at most 500×, at most 400×, at most 300×, at most 200×, at most 100×, at most 90×, at most 80×, at most 70×, at most 60×, at most 50×, or at most 40×. Any of the lower and upper values described in this paragraph may be combined to form a range included within the present disclosure, for example, in some instances the compound magnification of the imaging module may range from about 50× to about 700×. Those of skill in the art will recognize that the compound magnification of the imaging module may have any value within this range, e.g., about 750×.

Imaging module field-of-view (FOV): In some instances, the FOV of the imaging module may range, for example, between about 0.2 mm and 4 mm in diameter (or in the longest dimension). In some instances, the FOV may be at least 0.2, at least 0.4, at least 0.6, at least 0.8, at least 1.0 mm, at least 1.2 mm, at least 1.4 mm, at least 1.6 mm, at least 1.8 mm, at least 2.0 mm, at least 3.0 mm, or at least 4.0 mm in diameter (or in the longest dimension). In some instances, the FOV may be at most 4.0 mm, at most 3.0 mm, at most 2.0 mm, at most 1.8 mm, or at most 1.6 mm, at most 1.4 mm, at most 1.0 mm, at most 0.8 mm, at most 0.6 mm, at most 0.4 mm, or at most 0.2 mm in diameter (or in the longest dimension). Any of the lower and upper values described in this paragraph may be combined to form a range included within the present disclosure, for example, in some instances the FOV may range from about 1.2 mm to about 3.0 mm in diameter (or in the longest dimension). Those of skill in the art will recognize that, in some instances, the FOV may have any value within the range of values specified above, e.g., about 3.2 mm in diameter (or in the longest dimension).

Imaging module lateral optical resolution: In some instances, depending on, e.g., the numerical aperture of the objective lens in use and the wavelength of the light being imaged, the lateral optical resolution of the imaging module (i.e., the minimum distance between resolvable points in the sample plane of the imaging module) may range from about 0.2 μm to about 2 μm. In some instances, the lateral optical resolution may be at least 0.2 μm, at least 0.3 μm, at least 0.4 μm, at least 0.5 μm, at least 0.6 μm, at least 0.7 μm, at least 0.8 μm, at least 0.9 μm, at least 1.0 μm, at least 1.2 μm, at least 1.4 μm, at least 1.6 μm, at least 1.8 μm, or at least 2.0 μm. In some instances, the lateral optical resolution may be at most 2.0 μm, at most 1.8 μm, at most 1.6 μm, at most 1.4 μm, at most 1.2 μm, at most 1.0 μm, at most 0.9 μm, at most 0.8 μm, at most 0.7 μm, at most 0.6 μm, at most 0.5 μm, at most 0.4 μm, at most 0.3 μm, or at most 0.2 μm. Any of the lower and upper values described in this paragraph may be combined to form a range included within the present disclosure, for example, in some instances the lateral optical resolution may range from about 0.6 μm to about 1.2 μm. Those of skill in the art will recognize that, depending on the design of the imaging module, the lateral optical resolution may have any value within this range, e.g., about 0.85 μm.

Imaging module axial optical resolution: In some instances, the axial optical resolution (or "axial resolution") of the imaging module (i.e., the minimum distance between resolvable points that are separated axially along the optical axis of the imaging module) may range from about 0.5 μm, to about 2 μm. In some instances, the axial optical resolution may be at least 0.5 at least 0.6 μm, at least 0.7 μm, at least 0.8 μm, at least 0.9 μm, at least 1.0 μm, at least 1.2 at least 1.4 μm, at least 1.6 μm, at least 1.8 μm, or at least 2.0 μm. In some instances, the axial optical resolution may be at most 2.0 μm, at most 1.8 μm, at most 1.6 μm, at most 1.4 at most 1.2 μm, at most 1.0 μm, at most 0.9 μm, at most 0.8 μm, at most 0.7 μm, at most 0.6 or at most 0.5 μm. Any of the lower and upper values described in this paragraph may be combined to form a range included within the present disclosure, for example, in some instances the axial optical resolution may range from about 0.7 μm to about 1.6 μm. Those of skill in the art will recognize that, depending on the design of the imaging module, the axial optical resolution may have any value within this range, e.g., about 0.75 μm.

Depth of field: In some instances, the depth of field and/or minimum step size in the Z-direction for an imaging module (comprising, e.g., an objective lens and/or tube lens) may range from about 0.2 μm to about 5 μm, or more. In some instances, the depth of field and/or minimum step size may be at least 0.2 μm, at least 0.4 μm, at least 0.6 μm, at least 0.8 μm, at least 1.0 μm, at least 1.5 μm, at least 2.0 μm, at least 2.5 μm, at least 3.0 μm, at least 3.5 μm, at least 4.0 μm, at least 4.5 μm, or at least 5 μm, or more. In some instances, the depth of field and/or minimum step size may be at most 5 μm, at most 4.5 μm, at most 4.0 μm, at most 3.5 μm, at most 3.0 μm, at most 2.5 μm, at most 2.0 μm, at most 1.5 μm, at most 1.0 μm, at most 0.8 μm, at most 0.6 μm, at most 0.4

μm, or at most 0.2 μm. Any of the lower and upper values described in this paragraph may be combined to form a range included within the present disclosure, for example, in some instances the depth of field and/or minimum step size may range from about 0.2 μm to about 1.5 μm. Those of skill in the art will recognize that, in some instances, the depth of field and/or minimum step size may have any value within the range of values specified above, e.g., about 0.24 μm. In some instances, the minimum step size in the Z-direction may be at least 1×, 2×, 3×, 4×, 5×, 6×, 7×, 8×, 9×, 10×, 15×, or 20× the depth of field.

Fluorescence excitation wavelengths: In any of the fluorescence imaging configurations described herein, e.g., for single channel fluorescence imaging or multichannel fluorescence imaging configurations, at least one of the one or more light sources of the imaging module may produce visible light, such as green light and/or red light. In some instances, the at least one light source, alone or in combination with one or more optical components, e.g., excitation optical filters and/or dichroic beam splitters, may produce fluorescence excitation light at about 350 nm, 375 nm, 400 nm, 425 nm, 450 nm, 475 nm, 500 nm, 525 nm, 550 m, 575 nm, 600 nm, 625 nm, 650 nm, 675 nm, 700 nm, 725 nm, 750 nm, 775 nm, 800 nm, 825 nm, 850 nm, 875 nm, or 900 nm. Those of skill in the art will recognize that, in some instances, the fluorescence excitation wavelength may have any value within this range of values, e.g., about 620 nm.

Fluorescence excitation light bandwidths: In any of the fluorescence imaging configurations described herein, e.g., for single channel fluorescence imaging or multichannel fluorescence imaging configurations, at least one of the one or more light sources, alone or in combination with one or more optical components, e.g., excitation optical filters and/or dichroic beam splitters, may produce fluorescence excitation light at the specified excitation wavelength within a bandwidth of ±2 nm, ±5 nm, ±10 nm, ±20 nm, ±40 nm, ±80 nm, or greater. Those of skill in the art will recognize that, in some instances, the excitation light bandwidth may have any value within this range, e.g., about ±18 nm.

Fluorescence emission bands: In some instances, a fluorescence imaging module may be configured to detect fluorescence emission produced by any of a variety of fluorophores known to those of skill in the art. Examples of suitable fluorescence dyes for use in, e.g., genotyping and nucleic acid sequencing applications (e.g., by conjugation to nucleotides, oligonucleotides, or proteins) include, but are not limited to, fluorescein, rhodamine, coumarin, cyanine, and derivatives thereof, including the cyanine derivatives cyanine dye-3 (Cy3), cyanine dye-5 (Cy5), cyanine dye-7 (Cy7), etc.

Fluorescence emission wavelengths: In any of the fluorescence imaging configurations described herein, e.g., for single channel fluorescence imaging or multichannel fluorescence imaging configurations, the one or more detection channels of the imaging module may be configured to collect emission light at about 350 nm, 375 nm, 400 nm, 425 nm, 450 nm, 475 nm, 500 nm, 525 nm, 550 m, 575 nm, 600 nm, 625 nm, 650 nm, 675 nm, 700 nm, 725 nm, 750 nm, 775 nm, 800 nm, 825 nm, 850 nm, 875 nm, or 900 nm. Those of skill in the art will recognize that, in some instances, the emission wavelength may have any value within this range, e.g., about 825 nm.

Fluorescence emission light bandwidths: In any of the fluorescence imaging configurations described herein, e.g., for single channel fluorescence imaging or multichannel fluorescence imaging configurations, the one or more detection channels of the imaging module may be configured to collect light at the specified emission wavelength within a bandwidth of ±2 nm, ±5 nm, ±10 nm, ±20 nm, ±40 nm, ±80 nm, or greater. Those of skill in the art will recognize that, in some instances, the excitation bandwidths may have any value within this range, e.g., about ±18 nm.

Additional system components: In some instances, a system configured to implement the methods disclosed herein may comprise one or more commercial imaging instruments, one or more custom imaging modules, one or more additional processors or controllers (e.g., computers or computer systems), one or more sample carriers, one or more fluidics modules, one or more temperature control modules, one or more motion control modules (which may comprise one or more translation and/or rotation stages), one or more system control software packages, one or more data analysis (e.g., image processing) software packages, or any combination thereof. In some instances, the system may comprise an integrated system, e.g., where the different functional subsystems are mounted on a single framework or chassis, and packaged within a single housing. In some instances, the system may comprise a modular system, e.g., where the different functional subsystems are mounted on separate frameworks or chassis, and packaged in separate housings.

Sample carrier devices and adapters: In some instances, the biological sample is provided on any suitable substrate which may be fabricated from any of a variety of materials known to those of skill in the art including any transparent substrate. In some instances, a system configured to implement the methods disclosed herein may comprise one or more sample carrier devices and/or adapters configured to support or contain a sample, e.g., a tissue sample. Examples of sample carrier devices and adapters include, but are not limited to, microscope slides and/or adapters configured to mount microscope slides (with or without coverslips) on a microscope stage or automated stage (e.g., an automated translation or rotational stage), substrates, and/or adapters configured to mount slides on a microscope stage or automated stage, substrates comprising etched sample containment chambers (e.g., chambers open to the environment) and/or adapters configured to mount such substrates on a microscope stage or automated stage, flow cells and/or adapters configured to mount flow cells on a microscope stage or automated stage, or microfluidic devices and/or adapters configured to mount microfluidic devices on a microscope stage or automated stage.

In some instances, the one or more sample carrier devices may be designed for performing a variety of chemical analysis, biochemical analysis, nucleic acid analysis, cell analysis, or tissue analysis applications. In some instances, for example, flow cells and microfluidic devices may comprise a sample, e.g., a tissue sample. In some instances, flow cells and microfluidic devices may comprise a sample, e.g., a tissue sample, placed in contact with, e.g., a substrate (e.g., a surface within the flow cell or microfluidic device). In some instances, a flow cell may be a closed flow cell comprising fluid inlets and outlets, and a sample chamber or compartment that is not open to the surrounding environment. In some instances, a flow cell may be an open flow cell comprising fluid inlets and outlets, and a sample chamber or compartment that is open to and/or accessible from the surrounding environment.

In some instances, the systems disclosed herein may comprise 1, 2, 3, 4, 5, 6, 7, 8, 9, 10, or more than 10 sample carrier devices and/or adapters. In some instances, the one or more sample carrier devices may be fixed components of the disclosed systems. In some instances, the one or more sample carrier devices may be removable, exchangeable components of the disclosed systems. In some instances, the one or more sample carrier devices may be disposable or consumable components of the disclosed systems.

The sample carrier devices for the disclosed systems (e.g., microscope slides, substrates comprising one or more etched sample chambers, flow cells or microfluidic devices comprising one or more sample chambers, etc.) may be fabricated from any of a variety of materials known to those of skill in the art including, but not limited to, glass (e.g., borosilicate glass, soda lime glass, etc.), fused silica (quartz), silicon, polymer (e.g., polystyrene (PS), macroporous polystyrene (MPPS), polymethylmethacrylate (PMMA), polycarbonate (PC), polypropylene (PP), polyethylene (PE), high density polyethylene (HDPE), cyclic olefin polymers (COP), cyclic olefin copolymers (COC), polyethylene terephthalate (PET), polydimethylsiloxane (PDMS), etc.), polyetherimide (PEI) and perfluoroelastomer (FFKM) as more chemically inert alternatives, or any combination thereof. FFKM is also known as Kalrez.

The one or more materials used to fabricate sample carrier devices for the disclosed systems (e.g., microscope slides, substrates comprising one or more etched sample chambers, flow cells or microfluidic devices comprising one or more sample chambers, etc.) are often optically transparent to facilitate use with spectroscopic or imaging-based detection techniques. In some instances, the entire sample carrier device will be optically transparent. Alternatively, in some instances, only a portion of the sample carrier device (e.g., an optically transparent "window") will be optically transparent.

The sample carrier devices for the disclosed systems (e.g., microscope slides, substrates comprising one or more etched sample chambers, flow cells or microfluidic devices comprising one or more sample chambers, etc.) may be fabricated using any of a variety of techniques known to those of skill in the art, where the choice of fabrication technique is often dependent on the choice of material used, and vice versa. Examples of suitable sample carrier device fabrication techniques include, but are not limited to, extrusion, drawing, precision computer numerical control (CNC) machining and boring, laser photoablation, photolithography in combination with wet chemical etching, deep reactive ion etching (DRIE), micro-molding, embossing, 3D-printing, thermal bonding, adhesive bonding, anodic bonding, and the like (see, e.g., Gale, et al. (2018), "A Review of Current Methods in Microfluidic Device Fabrication and Future Commercialization Prospects", *Inventions* 3, 60, 1-25).

For sample carrier devices comprising sample chambers, e.g., chambers etched into a planar substrate or chambers within a flow cell or microfluidic device, the dimensions of the sample chambers may range from about 0.1 μm to about 10 cm in length, width, and/or height (depth). In some instances, the length, width, and/or height (depth) of the sample chambers (or "micro chambers") may be at least 0.1 μm, at least 0.5 μm, at least 1 μm, at least 5 μm, at least 10 μm, at least 50 μm, at least 100 μm, at least 500 μm, at least 1 mm, at least 5 mm, at least 1 cm, at least 5 cm, or at least 10 cm. Those of skill in the art will recognize that, in some instances, the length, width, and/or height (depth) of the sample chambers may have any value within this range, e.g., about 125 μm. In some instances, the length, width, and/or height (depth) of fluid channels (or "micro channels") within microfluidic devices (e.g., fluid channels to connect sample chambers to inlets or outlets) may have any value within the same range of values listed in this paragraph.

For sample carrier devices comprising sample chambers, e.g., chambers etched into a planar substrate or chambers within a flow cell or microfluidic device, the volume of the sample chambers (or "micro chambers") may range from about 1 nL to about 1 mL. In some instances, the volume of the sample chambers may be at least 1 nL, at least 5 nL, at least 10 nL, at least 50 nL, at least 100 nL, at least 500 nL, at least 1 μL, at least 5 μL, at least 10 μL, at least 50 μL, at least 100 μL, at least 500 μL, at least 1 mL. Those of skill in the art will recognize that, in some instances, the volume of the sample chambers may have any value within this range, e.g., about 1.3 μL.

Fluidics modules and components: In some instances, a system configured to implement the methods disclosed herein may comprise one or more fluidics modules (or fluidics controllers) configured to control the delivery of fluids such as reagents and/or buffers to a sample, e.g., a sample contained within a sample carrier device. In some instances, the one or more fluidics controllers may be configured to control volumetric flow rates for one or more fluids or reagents, linear flow velocities for one or more fluids or reagents, mixing ratios for one or more fluids or reagents, or any combination thereof. Fluidics modules may comprise one or more fluid flow sensors (e.g., flow rate sensors, pressure sensors, etc.), one or more fluid flow actuators (e.g., pumps), one or more fluid flow control devices (e.g., valves), one or more processors (and associated electronics), tubing and connectors to connect the one or more fluidics modules to one or more sample carrier devices, or any combination thereof.

In some instances, different modes of fluid flow control may be utilized at different points in time during an assay or analysis method, e.g. forward flow (relative to the inlet and outlet for a sample chamber, flow cell, or microfluidic device), reverse flow, oscillating or pulsatile flow, or any combination thereof. In some instances, for example, oscillating or pulsatile flow may be applied during assay wash/rinse steps to facilitate complete and efficient exchange of fluids within one or more sample chambers, flow cells, or microfluidic devices.

Fluid flow actuation: The one or more fluidics modules may be configured to support any of a variety of fluid flow actuation mechanisms known to those of skill in the art. Examples include, but are not limited to, pressure-driven flow, electrokinetic flow, electroosmotic flow, etc.

In some instances, fluid flow through the system may be controlled using one or more pumps, e.g., positive displacement pumps (e.g., diaphragm pumps, peristaltic pumps, piston pumps, syringe pumps, rotary vane pumps, etc.), metering pumps (e.g., oscillating positive displacement pumps designed for precise flow control), centrifugal pumps (e.g., rotary impellor pumps, axial impellor pumps), or any combination thereof. In some instances, fluid flow through a sample carrier device (e.g., a microfluidic device) may be controlled using miniaturized pumps integrated into the device (e.g., comprising electromechanically- or pneumatically-actuated miniature syringe or plunger mechanisms, chemical propellants, membrane diaphragm pumps actuated pneumatically or by an external piston, pneumatically-actuated reagent pouches or bladders, or electro-osmotic pumps). In some instances, fluid flow through the system may be controlled by applying positive pressure (e.g., using a pump or by applying positive pneumatic pressure) at one or more inlets of a sample carrier device. In some instances, fluid flow through the system may be controlled by applying negative pressure (e.g., using a pump or by applying negative pneumatic pressure (i.e., a vacuum)) at one or more outlets of a sample carrier device.

In some instances, fluid flow through the sample carrier device may be controlled using electrokinetic or electroosmotic flow (e.g., fluid flow controlled by applying electric fields within the sample carrier device). Electrokinetic effects include, for example, electrophoresis (the movement of charged particles within a fluid under the influence of an applied electric field), electroosmosis (the movement of fluid under the influence of an applied electric field), and streaming potentials or streaming currents (electrical potentials or currents generated by an electrolyte fluid moving through a porous material having charged surfaces). Electroosmosis, for example, may be actuated by using an electronic power supply and electrodes to apply an electric field across the length of a fluid channel or between the inlet and outlet of a sample chamber (see, e.g., Dutta, et al. (2002), "Electroosmotic Flow Control in Complex Microgeometries", *Journal of Microelectromechanical Systems* 11(1):36-44; Ghosal (2004), "Fluid Mechanics of Electroosmotic Flow and its Effect on Band Broadening in Capillary Electrophoresis", *Electrophoresis* 25:214-228).

In some instances, the fluidics module may comprise one or more valves to facilitate the control of fluid flow to sample carrier devices. Examples of suitable valves include, but are not limited to, check valves, electromechanical two-way or three-way valves, pneumatic two-way and three-way valves, or any combination thereof. In some instances, fluid flow through a sample carrier device (e.g., a microfluidic device) may be controlled using miniaturized valves integrated into the device (e.g., one-shot "valves" fabricated using wax or polymer plugs that can be melted or dissolved, or polymer membranes that can be punctured; pinch valves constructed using a deformable membrane and pneumatic, hydraulic, magnetic, electromagnetic, or electromechanical (solenoid) actuation, one-way valves constructed using deformable membrane flaps, and miniature gate valves).

In some instances, different fluid flow rates may be utilized at different locations within a sample carrier device (e.g., a flow cell device comprising more than one sample chamber or a microfluidic device), or at different times in the assay or analysis process.

Temperature control modules: In some instances, a system configured to implement the methods disclosed herein may comprise one or more temperature control modules (or temperature controllers) configured to maintain a specified temperature within one or more sample carrier device for the purpose of facilitating the accuracy and reproducibility of assay or analysis results. Examples of temperature control components that may be incorporated into sample carrier devices and/or the system and controlled by a temperature control module include, but are not limited to, resistive heating elements, infrared light sources, Peltier heating or cooling devices, heat sinks, thermistors, thermocouples, and the like.

In some instances, the temperature control module may provide for a programmable temperature change at a specified, adjustable time prior to performing specific assay or analysis steps. In some instances, the temperature control module may provide for programmable changes in temperature over specified time intervals. In some instances, the temperature control module may further provide for cycling of temperatures between two or more set temperatures with specified frequency and ramp rates so that thermal cycling, e.g., for performing nucleic acid amplification reactions, may be performed.

In some instances, the temperature control module may be configured to maintain constant temperatures, to implement step changes in temperature, or to implement changes in temperature at a specified ramp rate over a temperature range between about 10° C. and about 95° C. In some instances, for example, the temperature within a sample carrier device may be held constant at a specified temperature of 10° C., 15° C., 20° C., 25° C., 30° C., 35° C., 40° C., 45° C., 50° C., 55° C., 60° C., 65° C., 70° C., 75° C., 80° C., 85° C., 90° C., or 95° C. (or at any temperature within this range). In some instances, the temperature within a sample carrier device may be held constant at a specified temperature to within ±0.1° C., ±0.25° C., ±0.5° C., ±1° C., ±2.5° C., or ±5° C. (or at any tolerance within this range). In some instances, the temperature within a sample carrier device (e.g., a microfluidic device) may be ramped at a rate of 0.1° C./s, 0.5° C./s, 1° C./s, 5° C./s, 10° C./s, 50° C./s, 100° C./s, 500° C./s, or 1000° C./s (or at any temperature ramp rate within this range) (see, e.g., Miralles, et al. (2013), "A Review of Heating and Temperature Control in Microfluidic Systems: Techniques and Applications", *Diagnostics* 3:33-67).

Motion control modules: In some instances, a system configured to implement the methods disclosed herein may comprise one or more motion control modules (or motion controllers) configured to control the position of one or more sample carrier devices relative to an imaging module objective lens, or to control the position of an imaging module objective lens relative to one or more sample carrier devices. In some instances, the motion control module may control the position of the sample carrier device in one dimension, two dimensions, or three dimensions (e.g., in the X-, Y-, and/or Z-directions) relative to the imaging module objective lens, or vice versa. In some instances, the motion control module may separately or additionally control a degree of rotation of the sample carrier device in one, two, or three dimensions. In some instances, the motion control module may be interfaced with an imaging module to also provide control of an autofocus mechanism. For example, the motion control module may be configured to adjust the focal plane by moving the sample carrier device and/or by moving an objective lens (or other optical component) of the imaging module. In some instances, the motion control module may be interfaced with an imaging module to reposition a sample carrier device in the sample plane (e.g., the X-Y plane) between acquisition of a series of images that are subsequently used to create a composition image having a larger effective field-of-view than that of an individual image (e.g., to perform imaging tiling). In some instances, the motion control module may be interfaced with an imaging module to reposition a sample carrier device in a direction parallel to the optical axis of the imaging module (e.g., in the Z-direction) between acquisition of a series of images that are subsequently used to create a three dimensional representation of the sample (e.g., to perform volumetric imaging).

In some instances, the motion control module may comprise one or more (e.g., one, two, three, or more than three) translation stages, one or more (e.g., one, two, three, or more than three) rotational stages, one or more (e.g., one, two, three, or more than three) linear encoders, one or more (e.g., one, two, three, or more than three) rotary encoders, associated motors and control electronics, or any combination thereof. In some instances, the motion control module may further control components of the imaging module such as an automated microscope objective lens turret or slide, an automated microscope tube lens turret or slide, or a microscope turret-mounted focus adjustment mechanism.

Suitable translation stages are commercially available from a variety of vendors, for example, Parker Hannifin. Precision translation stage systems typically comprise a combination of several components including, but not limited to, linear actuators, optical encoders, servo and/or stepper motors, and motor controllers or drive units. High precision and repeatability of stage movement is required for the systems and methods disclosed herein in order to ensure accurate and reproducible positioning and imaging of, e.g., fluorescence signals when interspersing repeated steps of reagent delivery and optical detection.

System control module: In some instances, a system configured to implement the methods disclosed herein may comprise one or more system control modules (or system controllers) configured to synchronize and control data communication between other functional units of the system, e.g., the one or more imaging modules, one or more fluidics modules, one or more temperature control modules, one or more motion control modules, or any combination thereof. In some instances, a system control module may comprise one or more processors, one or more power supplies, one or more wired and/or wireless data communication interfaces, one or more memory storage devices, one or more user interface devices (e.g., keyboards, mice, displays, etc.), or any combination thereof. In some instances, the system control function may be provided by an external computer or computer system. In some instances, the one or more system control modules may interface with one or more external computers or computer systems.

System chassis and housing: As noted above, in some instances, the system may comprise an integrated system, e.g., where the different functional subsystems are mounted on a single framework or chassis, and packaged within a single housing. In some instances, the system may comprise an integrated optofluidic system. In some instances, the system may comprise a modular system, e.g., where the different functional subsystems are mounted on separate frameworks or chassis, and packaged in separate housings. The chassis may be constructed using any of a variety of materials (e.g., extruded aluminum or steel framing) and techniques (e.g., using fasteners, soldering, welding, etc.) known to those of skill in the art. Similarly, the housing (or enclosure) may be constructed using any of a variety of materials (e.g., sheet metal, plastic, etc.) and techniques (e.g., sheet metal bending, molding, etc.) known to those of skill in the art.

Also disclosed herein is software (e.g., stored on a non-transitory, computer readable storage medium) configured to instruct a system to perform any of the methods described herein. In some instances, the software may comprise system control software, image acquisition software, image analysis software, data analysis software, and/or visualization software.

System control software: In some instances, the disclosed systems may comprise a processor or computer and computer-readable media that includes code for providing a user interface as well as manual, semi-automated, or fully-automated control of all system functions, e.g. control of one or more imaging modules (or commercial imaging instruments, e.g., microscopes), one or more fluid control modules, one or more temperature control modules, etc. As noted above, in some instances, the system processor or computer may be an integrated component of the system (e.g., a microprocessor or mother board embedded within a system control module). In some instances, the processor or computer may be a stand-alone personal computer or laptop computer. Examples of imaging system control functions that may be provided by the system control software include, but are not limited to, autofocus capability, control of illumination or excitation light exposure times and intensities, control of image acquisition rate, exposure time, data storage options, and the like. Examples of fluid flow control functions that may be provided by the system control software include, but are not limited to, volumetric fluid flow rates, fluid flow velocities, the timing and duration for sample and reagent additions, rinse steps, and the like. Examples of temperature control functions that may be provided by the system control software include, but are not limited to, specifying temperature set point(s) and control of the timing, duration, and ramp rates for temperature changes. Examples of motion control functions that may be provided by the system control software include, but are not limited to, range of travel, translation stage velocity, translation stage acceleration, translation stage positioning accuracy, degree of rotation, rate of rotation, rate of rotational acceleration, rotational stage positioning accuracy, and the like.

Data analysis software: In some instances, the disclosed systems may comprise one or more data analysis and visualization software packages. Examples include, but are not limited to image processing software, image analysis software, statistical analysis software, data visualization and display software, and the like.

Examples of image processing and analysis capability that may be provided by the software include, but are not limited to, manual, semi-automated, or fully-automated image exposure adjustment (e.g. white balance, contrast adjustment), manual, semi-automated, or fully-automated image noise adjustment (e.g., signal-averaging, filtering, and/or other noise reduction functionality, etc.), manual, semi-automated, or fully-automated edge detection and object identification (e.g., for identifying clusters of amplified template nucleic acid molecules on a substrate surface), manual, semi-automated, or fully-automated signal intensity measurements and/or thresholding in one or more detection channels (e.g., one or more fluorescence emission channels), manual, semi-automated, or fully-automated statistical analysis (e.g., for comparison of signal intensities to a reference value for base-calling purposes).

Any of a variety of image processing and analysis algorithms known to those of skill in the art may be used to implement real-time or post-processing image analysis capability. Examples include, but are not limited to, the Canny edge detection method, the Canny-Deriche edge detection method, first-order gradient edge detection methods (e.g. the Sobel operator), second order differential edge detection methods, phase congruency (phase coherence) edge detection methods, other image segmentation algorithms (e.g. intensity thresholding, intensity clustering methods, intensity histogram-based methods, etc.), feature and pattern recognition algorithms (e.g. the generalized Hough transform for detecting arbitrary shapes, the circular Hough transform, etc.), and mathematical analysis algorithms (e.g. Fourier transform, fast Fourier transform, wavelet analysis, auto-correlation, etc.), or combinations thereof.

Any of a variety of statistical analysis methods known to those of skill in the art may be used in processing data generated by performing the disclosed methods. Examples include, but are not limited to, clustering, eigenvector-based analysis, regression analysis, probabilistic graphical modeling, or any combination thereof.

In some instances, the system control and data analysis software (e.g., image processing/analysis software, statistical analysis software, etc.) may be written as separate software modules. In some instances, the system control and image processing/analysis software may be incorporated into an integrated software package.

Samples:

A sample disclosed herein can be or derived from any biological sample. Methods and compositions disclosed herein may be used for analyzing a biological sample, which may be obtained from a subject using any of a variety of techniques including, but not limited to, biopsy, surgery, and laser capture microscopy (LCM), and generally includes cells and/or other biological material from the subject. In addition to the subjects described above, a biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample, a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a pre-disposition to a disease, and/or individuals in need of therapy or suspected of needing therapy.

The biological sample can include any number of macromolecules, for example, cellular macromolecules and organelles (e.g., mitochondria and nuclei). The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some instances, the biological sample may comprise cells which are deposited on a surface.

Cell-free biological samples can include extracellular macromolecules, e.g., polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells. Biological samples can also include fetal cells and immune cells.

In some instances, a substrate herein can be any support that is insoluble in aqueous liquid and which allows for positioning of biological samples, analytes, features, and/or reagents (e.g., probes) on the support. In some instances, a biological sample can be attached to a substrate. Attachment of the biological sample can be irreversible or reversible, depending upon the nature of the sample and subsequent steps in the analytical method. In certain instances, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. In some instances, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay. Except where indicated otherwise, the preparative or processing steps described below can generally be combined in any manner and in any order to appropriately prepare or process a particular sample for and/or analysis.

Tissue Sectioning:

A biological sample can be harvested from a subject (e.g., via surgical biopsy, whole subject sectioning) or grown in vitro on a growth substrate or culture dish as a population of cells, and prepared for analysis as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some instances, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 μm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 μm. Thicker sections can also be used if desired or convenient, e.g., at least 70, 80, 90, or 100 μm or more. Typically, the thickness of a tissue section is between 1-100 μm, 1-50 μm, 1-30 μm, 1-25 μm, 1-20 μm, 1-15 μm, 1-10 μm, 2-8 μm, 3-7 μm, or 4-6 μm, but as mentioned above, sections with thicknesses larger or smaller than these ranges can also be analyzed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analyzed successively to obtain three-dimensional information about the biological sample.

Freezing:

In some instances, the biological sample (e.g., a tissue section as described above) can be prepared by deep freezing at a temperature suitable to maintain or preserve the integrity (e.g., the physical characteristics) of the tissue structure. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than $-15°$ C., less than $-20°$ C., or less than $-25°$ C. In some instances, the biological sample can be from fresh frozen samples.

Fixation and Post-Fixation:

In some instances, the biological sample can be prepared using formalin-fixation and paraffin-embedding (FFPE), which are established methods. In some instances, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some instances, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some instances, the methods provided herein comprises one or more post-fixing (also referred to as post-fixation) steps. In some instances, one or more post-fixing step is performed after contacting a sample with a polynucleotide disclosed herein, e.g., one or more probes such as a circular or circularizable probe. In some instances, one or more post-fixing step is performed after a hybridization complex comprising a probe and a target is formed in a sample. In some instances, one or more post-fixing step is performed prior to a ligation reaction disclosed herein, such as the ligation to circularize a probe.

In some instances, one or more post-fixing step is performed after contacting a sample with a binding or labelling agent (e.g., an antibody or antigen binding fragment thereof) for a non-nucleic acid analyte such as a protein analyte. The labelling agent can comprise a nucleic acid molecule (e.g., reporter oligonucleotide) comprising a sequence corresponding to the labelling agent and therefore corresponds to (e.g., uniquely identifies) the analyte. In some instances, the labelling agent can comprise a reporter oligonucleotide comprising one or more barcode sequences. A post-fixing step may be performed using any suitable fixation reagent disclosed herein, for example, 3% (w/v) paraformaldehyde in DEPC-PBS.

Embedding and Crosslinking:

As an alternative to paraffin embedding described above, a biological sample can be embedded in any of a variety of other embedding materials to provide structural substrate to the sample prior to sectioning and other handling steps. In some cases, the embedding material can be removed e.g., prior to analysis of tissue sections obtained from the sample. Suitable embedding materials include, but are not limited to, waxes, resins (e.g., methacrylate resins), epoxies, and agar.

In some instances, the biological sample can be embedded in a matrix (e.g., a hydrogel matrix). Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some instances, the hydrogel is formed such that the hydrogel is internalized within the biological sample.

In some instances, the biological sample is immobilized in the hydrogel via cross-linking of the polymer material that forms the hydrogel. Cross-linking can be performed chemically and/or photochemically, or alternatively by any other hydrogel-formation method known in the art. In some instances, analytes (e.g., protein, RNA, and/or DNA), polynucleotides added to the sample (e.g., probes) and/or products thereof, in the biological sample can be embedded in a 3D matrix. In some instances, one or more of the analytes in the sample, polynucleotides contacted with the sample, and/or products thereof can be modified to contain functional groups that can be used as an anchoring site to attach to the polymer matrix. In some aspects, the 3D polymer matrix can be a hydrogel. In some instances, hydrogel formation within a biological sample is reversible.

In some instances, a hydrogel can include hydrogel subunits, such as, but not limited to, acrylamide, bis-acrylamide, polyacrylamide and derivatives thereof, poly(ethylene glycol) and derivatives thereof (e.g. PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample consists of cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 μm to about 2 mm. Additional methods and aspects of hydrogel embedding of biological samples are described for example in Chen et al., *Science* 347(6221): 543-548, 2015, the entire contents of which are incorporated herein by reference.

Hydrogels embedded within biological samples can be cleared using any suitable method. For example, electrophoretic tissue clearing methods can be used to remove biological macromolecules from the hydrogel-embedded sample. In some instances, a hydrogel-embedded sample is stored before or after clearing of hydrogel, in a medium (e.g., a mounting medium, methylcellulose, or other semisolid mediums).

In some instances, a method disclosed herein comprises de-crosslinking the reversibly cross-linked biological sample. The de-crosslinking does not need to be complete. In some instances, only a portion of crosslinked molecules in the reversibly cross-linked biological sample are de-crosslinked and allowed to migrate.

Staining and Immunohistochemistry (IHC):

To facilitate visualization, biological samples can be stained using a wide variety of stains and staining techniques. In some instances, for example, a sample can be stained using any number of stains and/or immunohistochemical reagents. One or more staining steps may be performed to prepare or process a biological sample for an assay described herein or may be performed during and/or after an assay. In some instances, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some instances, cells in the sample can be segmented using one or more images taken of the stained sample.

In some instances, the stain is performed using a lipophilic dye. In some examples, the staining is performed with a lipophilic carbocyanine or aminostyryl dye, or analogs thereof (e.g, DiI, DiO, DiR, DiD). Other cell membrane stains may include FM and RH dyes or immunohistochemical reagents specific for cell membrane proteins. In some examples, the stain may include but is not limited to, acridine orange, acid fuchsin, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine, or derivatives thereof. In some instances, the sample may be stained with haematoxylin and eosin (H&E).

The sample can be stained using hematoxylin and eosin (H&E) staining techniques, using Papanicolaou staining techniques, Masson's trichrome staining techniques, silver staining techniques, Sudan staining techniques, and/or using Periodic Acid Schiff (PAS) staining techniques. PAS staining is typically performed after formalin or acetone fixation. In some instances, the sample can be stained using Romanowsky stain, including Wright's stain, Jenner's stain, Can-Grunwald stain, Leishman stain, and Giemsa stain.

In some instances, biological samples can be destained. Methods of destaining or discoloring a biological sample are known in the art, and generally depend on the nature of the stain(s) applied to the sample. For example, in some instances, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., *J. Histochem. Cytochem.* 2017; 65(8): 431-444, Lin et al., *Nat Commun.* 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

Isometric Expansion:

In some instances, a biological sample embedded in a matrix (e.g., a hydrogel) can be isometrically expanded. Isometric expansion methods that can be used include hydration, a preparative step in expansion microscopy, as described in Chen, et al., *Science* 347(6221):543-548, 2015.

Isometric expansion can be performed by tethering (e.g., anchoring) one or more components of a biological sample to a gel, followed by gel formation, proteolysis, and swelling. In some instances, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some instances, the isometrically expanded biological sample can be removed from the substrate prior to contacting the substrate with probes disclosed herein.

In general, the steps used to perform isometric expansion of the biological sample can depend on the characteristics of the sample (e.g., thickness of tissue section, fixation, crosslinking), and/or the analyte of interest (e.g., different conditions to anchor RNA, DNA, and protein to a gel).

In some instances, proteins in the biological sample are anchored to a swellable gel such as a polyelectrolyte gel. An antibody can be directed to the protein before, after, or in conjunction with being anchored to the swellable gel. DNA and/or RNA in a biological sample can also be anchored to the swellable gel via a suitable linker. Examples of such linkers include, but are not limited to, 6-((Acryloyl)amino) hexanoic acid (Acryloyl-X SE) (available from ThermoFisher, Waltham, MA), Label-IT Amine (available from MirusBio, Madison, WI) and Label X (described for example in Chen, et al., Nat. Methods 13:679-684, 2016, the entire contents of which are incorporated herein by reference).

Isometric expansion of the sample can increase the spatial resolution of the subsequent analysis of the sample. The increased resolution in spatial profiling can be determined by comparison of an isometrically expanded sample with a sample that has not been isometrically expanded.

In some instances, a biological sample is isometrically expanded to a size at least 2x, 2.1x, 2.2x, 2.3x, 2.4x, 2.5x, 2.6x, 2.7x, 2.8x, 2.9x, 3x, 3.1x, 3.2x, 3.3x, 3.4x, 3.5x, 3.6x, 3.7x, 3.8x, 3.9x, 4x, 4.1x, 4.2x, 4.3x, 4.4x, 4.5x, 4.6x, 4.7x, 4.8x, or 4.9x its non-expanded size. In some instances, the sample is isometrically expanded to at least 2x and less than 20x of its non-expanded size.

Tissue Permeabilization and Treatment:

In some instances, a biological sample can be permeabilized to facilitate transfer of analytes out of the sample, and/or to facilitate transfer of species (such as probes) into the sample. If a sample is not permeabilized sufficiently, the amount of analyte captured from the sample may be too low to enable adequate analysis. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X100™ or Tween-20™), and enzymes (e.g., trypsin, proteases). In some instances, the biological sample can be incubated with a cellular permeabilizing agent to facilitate permeabilization of the sample. Additional methods for sample permeabilization are described, for example, in Jamur et al., Method Mol. Biol. 588:63-66, 2010, the entire contents of which are incorporated herein by reference. Any suitable method for sample permeabilization can generally be used in connection with the samples described herein.

In some instances, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some instances, the biological sample can be permeabilized by non-chemical permeabilization methods. Non-chemical permeabilization methods are known in the art. For example, non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some instances, DNase and RNase inactivating agents or inhibitors such as proteinase K, and/or chelating agents such as EDTA, can be added to the sample. For example, a method disclosed herein may comprise a step for increasing accessibility of a nucleic acid for binding, e.g., a denaturation step to open up DNA in a cell for hybridization by a probe. For example, proteinase K treatment may be used to free up DNA with proteins bound thereto.

Selective Enrichment of RNA Species:

In some instances, where RNA is the analyte, one or more RNA analyte species of interest can be selectively enriched. For example, one or more species of RNA of interest can be selected by addition of one or more oligonucleotides to the sample. In some instances, the additional oligonucleotide is a sequence used for priming a reaction by an enzyme (e.g., a polymerase). For example, one or more primer sequences with sequence complementarity to one or more RNAs of interest can be used to amplify the one or more RNAs of interest, thereby selectively enriching these RNAs.

An analyte of interest (such as a protein), bound by a labelling agent or binding agent (e.g., an antibody or epitope binding fragment thereof), wherein the binding agent is conjugated or otherwise associated with a reporter oligonucleotide comprising a reporter sequence that identifies the binding agent, can be targeted for analysis. Probes may be hybridized to the reporter oligonucleotide and ligated in a templated ligation reaction to generate a product for analysis. In some instances, gaps between the probe oligonucleotides may first be filled prior to ligation, using, for example, Mu polymerase, DNA polymerase, RNA polymerase, reverse transcriptase, VENT polymerase, Taq polymerase, and/or any combinations, derivatives, and variants (e.g., engineered mutants) thereof. In some instances, the assay can further include amplification of templated ligation products (e.g., by multiplex PCR).

In some instances, an oligonucleotide with sequence complementarity to the complementary strand of captured RNA (e.g., cDNA) can bind to the cDNA. For example, biotinylated oligonucleotides with sequence complementary to one or more cDNA of interest binds to the cDNA and can be selected using biotinylation-strepavidin affinity using any of a variety of methods known to the field (e.g., streptavidin beads).

Alternatively, one or more species of RNA can be down-selected (e.g., removed) using any of a variety of methods. For example, probes can be administered to a sample that selectively hybridize to ribosomal RNA (rRNA), thereby reducing the pool and concentration of rRNA in the sample. Additionally and alternatively, duplex-specific nuclease (DSN) treatment can remove rRNA (see, e.g., Archer, et al, Selective and flexible depletion of problematic sequences from RNA-seq libraries at the cDNA stage, *BMC Genomics,* 15 401, (2014), the entire contents of which are incorporated herein by reference). Furthermore, hydroxyapatite chromatography can remove abundant species (e.g., rRNA) (see, e.g., Vandernoot, V. A., cDNA normalization by hydroxyapatite chromatography to enrich transcriptome diversity in RNA-seq applications, *Biotechniques,* 53(6) 373-80, (2012), the entire contents of which are incorporated herein by reference).

A biological sample may comprise one or a plurality of analytes of interest. Methods for performing multiplexed assays to analyze two or more different analytes in a single biological sample are provided.

Analytes:

The methods and compositions disclosed herein can be used to detect and analyze a wide variety of different analytes. In some aspects, an analyte can include any biological substance, structure, moiety, or component to be analyzed. In some aspects, a target disclosed herein may similarly include any analyte of interest. In some examples, a target or analyte can be directly or indirectly detected.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for analyte detection) to the analytes in the cell or cell compartment or organelle.

The analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g. an affinity binding partner) can be developed. Such a specific binding partner may be a nucleic acid probe (for a nucleic acid analyte).

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof, or a lipid or carbohydrate molecule, or any molecule which comprise a lipid or carbohydrate component. The analyte may be a single molecule or a complex that contains two or more molecular subunits, e.g. including but not limited to protein-DNA complexes, which may or may not be covalently bound to one another, and which may be the same or different. Thus in addition to cells or microorganisms, such a complex analyte may also be a protein complex or protein interaction. Such a complex or interaction may thus be a homo- or hetero-multimer. Aggregates of molecules, e.g. proteins may also be target analytes, for example aggregates of the same protein or different proteins. The analyte may also be a complex between proteins or peptides and nucleic acid molecules such as DNA or RNA, e.g. interactions between proteins and nucleic acids, e.g. regulatory factors, such as transcription factors, and DNA or RNA.

Endogenous Analytes:

In some instances, an analyte herein is endogenous to a biological sample and can include nucleic acid analytes and non-nucleic acid analytes. Methods and compositions disclosed herein can be used to analyze nucleic acid analytes (e.g., using a nucleic acid probe or probe set that directly or indirectly hybridizes to a nucleic acid analyte) and/or non-nucleic acid analytes (e.g., using a labelling agent that comprises a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some instances, the analyte is inside a cell or on a cell surface, such as a transmembrane analyte or one that is attached to the cell membrane. In some instances, the analyte can be an organelle (e.g., nuclei or mitochondria). In some instances, the analyte is an extracellular analyte, such as a secreted analyte. Exemplary analytes include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR. The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In some instances described herein, an analyte may be a denatured nucleic acid, wherein the resulting denatured nucleic acid is single-stranded. The nucleic acid may be denatured, for example, optionally using formamide, heat, or both formamide and heat. In some instances, the nucleic acid is not denatured for use in a method disclosed herein.

In certain instances, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any implementation described herein, the analyte comprises a target sequence. In some instances, the target sequence may be endogenous to the sample, generated in the sample, added to the sample, or associated with an analyte in the sample. In some instances, the target sequence is a single-stranded target sequence (e.g., a sequence in a rolling circle amplification product). In some instances, the analytes comprise one or more single-stranded target sequences. In one aspect, a first single-stranded target sequence is not identical to a second single-stranded target sequence. In another aspect, a first single-stranded target sequence is identical to one or more second single-stranded target sequence. In some instances, the one or more second single-stranded target sequence is comprised in the same analyte (e.g., nucleic acid) as the first single-stranded target sequence. Alternatively, the one or more second single-stranded target sequence is comprised in a different analyte (e.g., nucleic acid) from the first single-stranded target sequence.

Labelling Agents:

In some instances, provided herein are methods and compositions for analyzing endogenous analytes (e.g., RNA, ssDNA, and cell surface or intracellular proteins and/or metabolites) in a sample using one or more labelling agents. In some instances, an analyte labelling agent may include an agent that interacts with an analyte (e.g., an endogenous analyte in a sample). In some instances, the labelling agents can comprise a reporter oligonucleotide that is indicative of the analyte or portion thereof interacting with the labelling agent. For example, the reporter oligonucleotide may comprise a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some instances, the analyte labelling agent comprises an analyte binding moiety and a labelling agent barcode domain comprising one or more barcode sequences, e.g., a barcode sequence that corresponds to the analyte binding moiety and/or the analyte. An analyte binding moiety barcode includes to a barcode that is associated with or otherwise identifies the analyte binding moiety. In some instances, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some instances, the method comprises one or more post-fixing (also referred to as post-fixation) steps after contacting the sample with one or more labelling agents.

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some instances, an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some instances, an analyte binding moiety includes one or more antibodies or antigen binding fragments thereof. The antibodies or antigen binding fragments including the analyte binding moiety can specifically bind to a target analyte. In some instances, the analyte is a protein (e.g., a protein on a surface of the biological sample (e.g., a cell) or an intracellular protein). In some instances, a plurality of analyte labelling agents comprising a plurality of analyte binding moieties bind a plurality of analytes present in a biological sample. In some instances, the plurality of analytes includes a single species of analyte (e.g., a single species of polypeptide). In some instances in which the plurality of analytes includes a single species of analyte, the analyte binding moieties of the plurality of analyte labelling agents are the same. In some instances in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some instances, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being readily detected.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2):708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry may be used to couple reporter oligonucleotides to labelling agents. Commercially available kits, such as those from Thunderlink and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some instances, the reporter oligonucleotides are releasable from the labelling agent, such as upon application of a stimulus. For example, the reporter oligonucleotide may be attached to the labelling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing.

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some instances, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (i.e., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

Assays for In Situ Detection and Analysis:

Objectives for in situ detection and analysis methods include detecting, quantifying, and/or mapping analytes (e.g., gene activity) to specific regions in a biological sample (e.g., a tissue sample or cells deposited on a surface) at cellular or sub-cellular resolution. Methods for performing in situ studies include a variety of techniques, e.g., in situ hybridization techniques. These techniques allow one to study the subcellular distribution of target analytes (e.g., gene activity as evidenced, e.g., by expressed gene transcripts), and have the potential to provide crucial insights in the fields of developmental biology, oncology, immunology, histology, etc. In some instances, tilted-SIM fluorescence imaging provided herein may be useful for in situ applications that include in situ detection of signals corresponding to spots (e.g., fluorescent spots of certain sizes generated using methods comprising signal amplification).

Various methods can be used for in situ detection and analysis of target analytes, e.g., sequencing by synthesis (SBS), sequencing by ligation (SBL), sequencing by hybridization (SBH). Non-limiting examples of in situ hybridization techniques include single molecule fluorescence in situ hybridization (smFISH) and multiplexed error-robust fluorescence in situ hybridization (MERFISH). smFISH enables in situ detection and quantification of gene transcripts in tissue samples at the locations where they reside by making use of libraries of multiple short oligonucleotide probes (e.g., approximately 20 base pairs (bp) in length), each labeled with a fluorophore. The probes are sequentially hybridized to gene sequences (e.g., DNA) or gene transcript sequences (e.g., mRNA) sequences, and visualized as diffraction-limited spots by fluorescence microscopy (Levsky, et al. (2003) "Fluorescence In situ Hybridization: Past, Present and Future", Journal of Cell Science 116(14):2833-2838; Raj, et al. (2008) "Imaging Individual mRNA Molecules Using Multiple Singly Labeled Probes", Nat Methods 5(10): 877-879; Moor, et al. (2016), ibid.). Variations on the smFISH method include, for example, the use of combinatorial labelling schemes to improve multiplexing capability (Levsky, et al. (2003), ibid.), the use of smFISH in combination with super-resolution microscopy (Lubeck, et al. (2014) "Single-Cell In situ RNA Profiling by Sequential Hybridization", Nature Methods 11(4):360-361). Non-limiting examples of in situ sequencing or detection techniques include in situ sequencing with padlock probes (ISS-PLP), fluorescent in situ sequencing (FISSEQ), barcode in situ targeted sequencing (Barista-Seq), and spatially-resolved transcript amplicon readout mapping (STARmap) (see, e.g., Ke, et al. (2016), ibid., Asp, et al. (2020), ibid.).

Some methods for in situ detection and analysis of analytes utilize a probe (e.g., padlock or circular probe) that detects specific target analytes. The in situ sequencing using padlock probes (ISS-PLP) method, for example, combines padlock probing to target specific gene transcripts, rolling-circle amplification (RCA), and sequencing by ligation (SBL) chemistry. Within intact tissue sections, reverse transcription primers are hybridized to target sequence (e.g., mRNA sequences) and reverse transcription is performed to create cDNA to which a padlock probe (a single-stranded DNA molecule comprising regions that are complementary to the target cDNA) can bind (see, e.g., Asp, et al. (2020), ibid.). In one variation of the method, the padlock probe binds to the cDNA target with a gap remaining between the ends which is then filled in using a DNA polymerization reaction. In another variation of the method, the ends of the bound padlock probe are adjacent to each other. The ends are then ligated to create a circular DNA molecule. Target amplification using rolling-circle amplification (RCA) results in micrometer-sized RCA products (RCPs), containing a plurality of concatenated repeats of the probe sequence. In some examples, RCPs are then subjected to, e.g., sequencing-by-ligation (SBL) or sequencing-by-hybridization (SBH). In some cases, the method allows for a barcode located within the probe to be decoded.

Products of Endogenous Analytes and/or Labelling Agents:

In some instances, provided herein are methods and compositions for analyzing one or more products of an endogenous analyte and/or a labelling agent in a biological sample. In some instances, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product such as a rolling circle amplification (RCA) product) thereof is analyzed. In some instances, a labelling agent that directly or indirectly binds to an analyte in the biological sample is analyzed. In some instances, a product (e.g., a hybridization product, a ligation product, an extension product (e.g., by a DNA or RNA polymerase), a replication product, a transcription/reverse transcription product, and/or an amplification product such as a rolling circle amplification (RCA) product) of a labelling agent that directly or indirectly binds to an analyte in the biological sample is analyzed.

In some instances, the analyzing comprises using primary probes which comprise a target binding region (e.g., a region that binds to a target such as RNA transcripts) and the primary probes may contain one or more barcodes (e.g., primary barcode). In some instances, the barcodes are bound by detection primary probes, which do not need to be fluorescent, but that include a target-binding portion (e.g., for hybridizing to one or more primary probes) and one or more barcodes (e.g., secondary barcodes). In some instances, the detection primary probe comprises an overhang that does not hybridize to the target nucleic acid but hybridizes to another probe. In some examples, the overhang comprises the barcode(s). In some instances, the barcodes of the detection primary probes are targeted by detectably labeled detection oligonucleotides, such as fluorescently labeled oligos. In some instances, one or more decoding schemes are used to decode the signals, such as fluorescence, for sequence determination. Various probes and probe sets can be used to hybridize to and detect an endogenous analyte and/or a sequence associated with a labelling agent. In some instances, these assays may enable multiplexed detection, signal amplification, combinatorial decoding, and error correction schemes. Exemplary barcoded probes or probe sets may be based on a padlock probe, a gapped padlock probe, a SNAIL (Splint Nucleotide Assisted Intra-molecular Ligation) probe set, a PLAYR (Proximity Ligation Assay for RNA) probe set, a PLISH (Proximity Ligation in situ Hybridization) probe set. The specific probe or probe set design can vary.

Hybridization and Ligation:

Various probes and probe sets can be hybridized to an endogenous analyte and/or a labelling agent and each probe may comprise one or more barcode sequences. The specific probe or probe set design can vary. In some instances, the hybridization of a primary probe or probe set (e.g., a circularizable probe or probe set) to a target nucleic acid analyte and may lead to the generation of a rolling circle amplification (RCA) template. In some instances, the assay uses or generates a circular nucleic acid molecule which can be the RCA template.

In some instances, a product of an endogenous analyte and/or a labelling agent is a ligation product. In some instances, the ligation product is formed from circularization of a circularizable probe or probe set upon hybridization to a target sequence. In some instances, the ligation product is formed between two or more endogenous analytes. In some instances, the ligation product is formed between an endogenous analyte and a labelling agent. In some instances, the ligation product is formed between two or more labelling agent. In some instances, the ligation product is an intramolecular ligation of an endogenous analyte. In some instances, the ligation product is an intramolecular ligation of a labelling agent, for example, the circularization of a circularizable probe or probe set upon hybridization to a target sequence. The target sequence can be comprised in an endogenous analyte (e.g., nucleic acid such as a genomic DNA or mRNA) or a product thereof (e.g., cDNA from a cellular mRNA transcript), or in a labelling agent (e.g., the reporter oligonucleotide) or a product thereof.

In some instances, provided herein is a probe or probe set capable of DNA-templated ligation, such as from a cDNA molecule. See, e.g., U.S. Pat. No. 8,551,710, which is hereby incorporated by reference in its entirety. In some instances, provided herein is a probe or probe set capable of RNA-templated ligation. See, e.g., U.S. Pat. Pub. 2020/0224244 which is hereby incorporated by reference in its entirety. In some instances, the probe set is a SNAIL probe set. See, e.g., U.S. Pat. Pub. 20190055594, which is hereby incorporated by reference in its entirety. In some instances, provided herein is a multiplexed proximity ligation assay. See, e.g., U.S. Pat. Pub. 20140194311 which is hereby incorporated by reference in its entirety. In some instances, provided herein is a probe or probe set capable of proximity ligation, for instance a proximity ligation assay for RNA (e.g., PLAYR) probe set. See, e.g., U.S. Pat. Pub. 20160108458, which is hereby incorporated by reference in its entirety. In some instances, a circular probe can be indirectly hybridized to the target nucleic acid. In some instances, the circular construct is formed from a probe set capable of proximity ligation, for instance a proximity ligation in situ hybridization (PLISH) probe set. See, e.g., U.S. Pat. Pub. 2020/0224243 which is hereby incorporated by reference in its entirety.

In some instances, the ligation involves chemical ligation. In some instances, the ligation involves template dependent ligation. In some instances, the ligation involves template independent ligation. In some instances, the ligation involves enzymatic ligation.

In some instances, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as *E. coli* DNA ligase, Tth DNA ligase, *Thermococcus* sp. (strain 9° N) DNA ligase (9° N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some instances, the ligase is a T4 RNA ligase. In some instances, the ligase is a splintR ligase. In some instances, the ligase is a single stranded DNA ligase. In some instances, the ligase is a T4 DNA ligase. In some instances, the ligase is a ligase that has an DNA-splinted DNA ligase activity. In some instances, the ligase is a ligase that has an RNA-splinted DNA ligase activity.

In some instances, the ligation herein is a direct ligation. In some instances, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, i.e., separated by one or more intervening nucleotides or "gaps". In some instances, said ends are not ligated directly to each other, but instead occurs either via the intermediacy of one or more intervening (so-called "gap" or "gap-filling" (oligo)nucleotides) or by the extension of the 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo)nucleotide(s) which are complementary to a splint, padlock probe, or target nucleic acid. The gap may be a gap of 1 to 60 nucleotides or a gap of 1 to 40 nucleotides or a gap of 3 to 40 nucleotides. In specific implementations, the gap may be a gap of about 1, 2, 3, 4, 5, 6, 7, 8, 9 or 10 or more nucleotides, of any integer (or range of integers) of nucleotides in between the indicated values. In some instances, the gap between said terminal regions may be filled by a gap oligonucleotide or by extending the 3' end of a polynucleotide. In some cases, ligation involves ligating the ends of the probe to at least one gap (oligo)nucleotide, such that the gap (oligo)nucleotide becomes incorporated into the resulting polynucleotide. In some instances, the ligation herein is preceded by gap filling. In other implementations, the ligation herein does not require gap filling.

In some instances, ligation of the polynucleotides produces polynucleotides with melting temperature higher than that of un-ligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature (Tm) of the DNA strands. This selectively reduces the concentration of annealed mismatched substrates (expected to have a slightly lower Tm around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some instances, the ligation herein is a proximity ligation of ligating two (or more) nucleic acid sequences that are in proximity with each other, e.g., through enzymatic means (e.g., a ligase). In some instances, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

Primer Extension and Amplification:

In some instances, the hybridization of a primary probe or probe set (e.g. a circularizable probe or probe set) to a target analyte and may lead to the generation of an extension or amplification product. In some instances, a product is a primer extension product of an analyte, a labelling agent, a probe or probe set bound to the analyte (e.g., a circularizable probe bound to genomic DNA, mRNA, or cDNA), or a probe or probe set bound to the labelling agent (e.g., a circularizable probe bound to one or more reporter oligonucleotides from the same or different labelling agents.

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence. A primer extension reaction generally refers to any method where two nucleic acid sequences become linked (e.g., hybridized) by an overlap of their respective terminal complementary nucleic acid sequences (i.e., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

In some instances, a product of an endogenous analyte and/or a labelling agent is an amplification product of one or more polynucleotides, for instance, a circular probe or circularizable probe or probe set. In some instances, the disclosed methods may comprise the use of a rolling circle amplification (RCA) technique to amplify signal. Rolling circle amplification is an isothermal, DNA polymerase-mediated process in which long single-stranded DNA molecules are synthesized on a short circular single-stranded DNA template using a single DNA primer (Zhao, et al. (2008), "Rolling Circle Amplification: Applications in Nanotechnology and Biodetection with Functional Nucleic Acids", *Angew Chem Int Ed Engl.* 47(34):6330-6337; Ali, et al. (2014), "Rolling Circle Amplification: A Versatile Tool for Chemical Biology, Materials Science and Medicine", *Chem Soc Rev.* 43(10):3324-3341). The RCA product is a concatemer containing tens to hundreds of tandem repeats that are complementary to the circular template, and may be used to develop sensitive techniques for the detection of a variety of targets, including nucleic acids (DNA, RNA), small molecules, proteins, and cells (Ali, et al. (2014), ibid.). In some implementations, a primer that hybridizes to the circular probe or circularized probe is added and used as such for amplification. In some instances, the RCA comprises a linear RCA, a branched RCA, a dendritic RCA, or any combination thereof.

In some instances, the amplification is performed at a temperature between or between about 20° C. and about 60° C. In some instances, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C.

In some instances, upon addition of a DNA polymerase in the presence of appropriate dNTP precursors and other cofactors, a primer is elongated to produce multiple copies of the circular template. This amplification step can utilize isothermal amplification or non-isothermal amplification. In some instances, after the formation of the hybridization complex and association of the amplification probe, the hybridization complex is rolling-circle amplified to generate a cDNA nanoball (i.e., amplicon) containing multiple copies of the cDNA. Techniques for rolling circle amplification (RCA) are known in the art such as linear RCA, a branched RCA, a dendritic RCA, or any combination thereof. (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49(11): 2540-2550; Schweitzer et al. Proc. Natl Acad. Sci. USA 97:101 13-1 19, 2000; Faruqi et al, BMC Genomics 2:4, 2000; Nallur et al, Nucl. Acids Res. 29:e1 18, 2001; Dean et al. Genome Res. 11: 1095-1099, 2001; Schweitzer et al, Nature Biotech. 20:359-365, 2002; U.S. Pat. Nos. 6,054,274, 6,291,187, 6,323,009, 6,344,329 and 6,368,801). Exemplary polymerases for use in RCA comprise DNA polymerase such phi29 (φ29) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some instances, the polymerase is phi29 DNA polymerase.

In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some aspects, the amplification products comprises a modified nucleotide, such as an amine-modified nucleotide. In some instances, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some instances, the RCA template may comprise the target analyte, or a part thereof, where the target analyte is a nucleic acid, or it may be provided or generated as a proxy, or a marker, for the analyte. In some instances, the RCA template may comprise a sequence of the probes and probe sets hybridized to an endogenous analyte and/or a labelling agent. In some instances, the amplification product can be generated as a proxy, or a marker, for the analyte. As noted above, many assays are known for the detection of numerous different analytes, which use a RCA-based detection system, e.g., where the signal is provided by generating a RCP from a circular RCA template which is provided or generated in the assay, and the RCP is detected to detect the analyte. The RCP may thus be regarded as a reporter which is detected to detect the target analyte. However, the RCA template may also be regarded as a reporter for the target analyte; the RCP is generated based on the RCA template, and comprises complementary copies of the RCA template. The RCA template determines the signal which is detected, and is thus indicative of the target analyte. As will be described in more detail below, the RCA template may be a probe, or a part or component of a probe, or may be generated from a probe, or it may be a component of a detection assay (i.e. a reagent in a detection assay), which is used as a reporter for the assay, or a part of a reporter, or signal-generation system. The RCA template used to generate the RCP may thus be a circular (e.g. circularized) reporter nucleic acid molecule, namely from any RCA-based detection assay which uses or generates a circular nucleic acid molecule as a reporter for the assay. Since the RCA template generates the RCP reporter, it may be viewed as part of the reporter system for the assay.

In some instances, an assay may detect a product herein that includes a molecule or a complex generated in a series of reactions, e.g., hybridization, ligation, extension, replication, transcription/reverse transcription, and/or amplification (e.g., rolling circle amplification), in any suitable combination. For example, a product comprising a target sequence for a probe disclosed herein (e.g., a bridge probe) may be a hybridization complex formed of a cellular nucleic acid in a sample and an exogenously added nucleic acid probe. The exogenously added nucleic acid probe may comprise an overhang that does not hybridize to the cellular nucleic acid but hybridizes to another probe (e.g., a detection probe). The exogenously added nucleic acid probe may be optionally ligated to a cellular nucleic acid molecule or another exogenous nucleic acid molecule. In other examples, a product comprising a target sequence for a probe disclosed herein (e.g., an anchor probe) may be an RCP of a circularizable probe or probe set which hybridizes to a cellular nucleic acid molecule (e.g., genomic DNA or mRNA) or product thereof (e.g., a transcript such as cDNA, a DNA-templated ligation product of two probes, or an RNA-templated ligation product of two probes). In other examples, a product comprising a target sequence for a probe disclosed herein (e.g., a bridge probe) may be a probe hybridizing to an RCP. The probe may comprise an overhang that does not hybridize to the RCP but hybridizes to another probe (e.g., a detection probe).

Signal Amplification Methods:

In some instances, a method disclosed herein may also comprise one or more signal amplification components and detecting such signals. In some instances, tilted-SIM fluorescence imaging provided herein may be particularly-well suited for in situ assays that comprise signal amplification. In some instances, an approach that improves resolution in any dimension may be beneficial for microscopy based in situ applications. In some instances, the present disclosure relates to the detection of nucleic acid sequences in situ using probe hybridization and generation of amplified signals associated with the probes (e.g., enzymatic or non-enzymatic amplification). In some instances, the target nucleic acid of a nucleic acid probe comprises multiple target sequences for nucleic acid probe hybridization, such that the signal corresponding to a barcode sequence of the nucleic acid probe is amplified by the presence of multiple nucleic acid probes hybridized to the target nucleic acid. For example, multiple sequences can be selected from a target nucleic acid such as an mRNA, such that a group of nucleic acid probes (e.g., 20-50 nucleic acid probes) hybridize to the mRNA in a tiled fashion. In another example, the target nucleic acid can be an amplification product (e.g., an RCA product) comprising multiple copies of a target sequence (e.g., a barcode sequence of the RCA product).

Alternatively or additionally, amplification of a signal associated with a barcode sequence of a nucleic acid probe can be amplified using one or more signal amplification strategies off of an oligonucleotide probe that hybridizes to the barcode sequence. In some aspects, amplification of the signal associated with the oligonucleotide probe can reduce the number of nucleic acid probes needed to hybridize to the target nucleic acid to obtain a sufficient signal-to-noise ratio. For example, the number of nucleic acid probes to tile a target nucleic acid such as an mRNA can be reduced. In some aspects, reducing the number of nucleic acid probes tiling a target nucleic acid enables detection of shorter target nucleic acids, such as shorter mRNAs. In some instances, no more than one, two, three, 4, 5, 6, 7, 8, 9, 10, 11, 12, 13, 14, 15, 16, 17, 18. 19, or 20 nucleic acid probes may be hybridized to the target nucleic acid. In instances wherein the target nucleic acid is an amplification product, signal amplification off of the oligonucleotide probes may reduce the number of target sequences required for detection (e.g., the length of the RCA product can be reduced). In some instances, the amplification product generated using an of the exemplary signal amplification methods provided herein produces a fluorescent spot with a diameter of at least about 200 nm, about 300 nm, about 400 nm, about 500 nm, or between any of the aforementioned values. Exemplary signal amplification methods include targeted deposition of detectable reactive molecules around the site of probe hybridization, targeted assembly of branched structures (e.g., bDNA or branched assay using locked nucleic acid (LNA)), programmed in situ growth of concatemers by enzymatic rolling circle amplification (RCA) (e.g., as described in US 2019/0055594 incorporated herein by reference), hybridization chain reaction, assembly of topologically catenated DNA structures using serial rounds of chemical ligation (clampFISH), signal amplification via hairpin-mediated concatemerization (e.g., as described in US 2020/0362398 incorporated herein by reference), e.g., primer exchange reactions such as signal amplification by exchange reaction (SABER) or SABER with DNA-Exchange (Exchange-SABER). In some instances, a non-enzymatic signal amplification method may be used.

The detectable reactive molecules may comprise tyramide, such as used in tyramide signal amplification (TSA) or multiplexed catalyzed reporter deposition (CARD)-FISH. In some instances, the detectable reactive molecule may be releasable and/or cleavable from a detectable label such as a fluorophore. In some instances, a method disclosed herein comprises multiplexed analysis of a biological sample comprising consecutive cycles of probe hybridization, fluorescence imaging, and signal removal, where the signal removal comprises removing the fluorophore from a fluorophore-labeled reactive molecule (e.g., tyramide). Exemplary detectable reactive reagents and methods are described in U.S. Pat. No. 6,828,109, US 2019/0376956, WO 2019/236841, WO 2020/102094, WO 2020/163397, and WO 2021/067475, all of which are incorporated herein by reference in their entireties.

In some instances, hybridization chain reaction (HCR) can be used for signal amplification. HCR is an enzyme-free nucleic acid amplification based on a triggered chain of hybridization of nucleic acid molecules starting from HCR monomers, which hybridize to one another to form a nicked nucleic acid polymer. This polymer is the product of the HCR reaction which is ultimately detected in order to indicate the presence of the target analyte. HCR is described in detail in Dirks and Pierce, 2004, PNAS, 101(43), 15275-15278 and in U.S. Pat. Nos. 7,632,641 and 7,721,721 (see also US 2006/00234261; Chemeris et al, 2008 Doklady Biochemistry and Biophysics, 419, 53-55; Niu et al, 2010, 46, 3089-3091; Choi et al, 2010, Nat. Biotechnol. 28(11), 1208-1212; and Song et al, 2012, Analyst, 137, 1396-1401). HCR monomers typically comprise a hairpin, or other metastable nucleic acid structure. In the simplest form of HCR, two different types of stable hairpin monomer, referred to here as first and second HCR monomers, undergo a chain reaction of hybridization events to form a long nicked double-stranded DNA molecule when an "initiator" nucleic acid molecule is introduced. The HCR monomers have a hairpin structure comprising a double stranded stem region, a loop region connecting the two strands of the stem region, and a single stranded region at one end of the double stranded stem region. The single stranded region which is exposed (and which is thus available for hybridization to another molecule, e.g. initiator or other HCR monomer) when the monomers are in the hairpin structure may be known as the "toehold region" (or "input domain"). The first HCR monomers each further comprise a sequence which is complementary to a sequence in the exposed toehold region of the second HCR monomers. This sequence of complementarity in the first HCR monomers may be known as the "interacting region" (or "output domain"). Similarly, the second HCR monomers each comprise an interacting region (output domain), e.g. a sequence which is complementary to the exposed toehold region (input domain) of the first HCR monomers. In the absence of the HCR initiator, these interacting regions are protected by the secondary structure (e.g. they are not exposed), and thus the hairpin monomers are stable or kinetically trapped (also referred to as "metastable"), and remain as monomers (e.g. preventing the system from rapidly equilibrating), because the first and second sets of HCR monomers cannot hybridize to each other. However, once the initiator is introduced, it is able to hybridize to the exposed toehold region of a first HCR monomer, and invade it, causing it to open up. This exposes the interacting region of the first HCR monomer (e.g. the sequence of complementarity to the toehold region of the second HCR monomers), allowing it to hybridize to and invade a second HCR monomer at the toehold region. This hybridization and invasion in turn opens up the second HCR monomer, exposing its interacting region (which is complementary to the toehold region of the first HCR monomers), and allowing it to hybridize to and invade another first HCR monomer. The reaction continues in this manner until all of the HCR monomers are exhausted (e.g. all of the HCR monomers are incorporated into a polymeric chain). Ultimately, this chain reaction leads to the formation of a nicked chain of alternating units of the first and second monomer species. The presence of the HCR initiator is thus required in order to trigger the HCR reaction by hybridization to and invasion of a first HCR monomer. The first and second HCR monomers are designed to hybridize to one another are thus may be defined as cognate to one another. They are also cognate to a given HCR initiator sequence. HCR monomers which interact with one another (hybridize) may be described as a set of HCR monomers or an HCR monomer, or hairpin, system.

An HCR reaction could be carried out with more than two species or types of HCR monomers. For example, a system involving three HCR monomers could be used. In such a system, each first HCR monomer may comprise an interacting region which binds to the toehold region of a second HCR monomer; each second HCR may comprise an interacting region which binds to the toehold region of a third HCR monomer; and each third HCR monomer may comprise an interacting region which binds to the toehold region of a first HCR monomer. The HCR polymerization reaction would then proceed as described above, except that the resulting product would be a polymer having a repeating unit of first, second and third monomers consecutively. Corresponding systems with larger numbers of sets of HCR monomers could readily be conceived. Branching HCR systems have also been devised and described (see, e.g., WO 2020/123742 incorporated herein by reference), and may be used in the methods herein.

In some instances, similar to HCR reactions that use hairpin monomers, linear oligo hybridization chain reaction (LO-HCR) can also be used for signal amplification. In some instances, provided herein is a method of detecting an analyte in a sample comprising: (i) performing a linear oligo hybridization chain reaction (LO-HCR), wherein an initiator is contacted with a plurality of LO-HCR monomers of at least a first and a second species to generate a polymeric LO-HCR product hybridized to a target nucleic acid molecule, wherein the first species comprises a first hybridization region complementary to the initiator and a second hybridization region complementary to the second species, wherein the first species and the second species are linear, single-stranded nucleic acid molecules; wherein the initiator is provided in one or more parts, and hybridizes directly or indirectly to or is comprised in the target nucleic acid molecule; and (ii) detecting the polymeric product, thereby detecting the analyte. In some instances, the first species and/or the second species may not comprise a hairpin structure. In some instances, the plurality of LO-HCR monomers may not comprise a metastable secondary structure. In some instances, the LO-HCR polymer may not comprise a branched structure. In some instances, performing the linear oligo hybridization chain reaction comprises contacting the target nucleic acid molecule with the initiator to provide the initiator hybridized to the target nucleic acid molecule. In any of the instances herein, the target nucleic acid molecule and/or the analyte can be an RCA product.

In some instances, detection of nucleic acids sequences in situ includes combination of the sequential decoding methods described herein with an assembly for branched signal amplification. In some instances, the assembly complex comprises an amplifier hybridized directly or indirectly (via one or more oligonucleotides) to a sequence of an oligonucleotide probe described herein. In some instances, the assembly includes one or more amplifiers each including an amplifier repeating sequence. In some aspects, the one or more amplifiers is labeled. Described herein is a method of using the aforementioned assembly, including for example, using the assembly in multiplexed error-robust fluorescent in situ hybridization (MERFISH) applications, with branched DNA amplification for signal readout. In some instances, the amplifier repeating sequence is about 5-30 nucleotides, and is repeated N times in the amplifier. In some instances, the amplifier repeating sequence is about 20 nucleotides, and is repeated at least two times in the amplifier. In some aspects, the one or more amplifier repeating sequence is labeled. For exemplary branched signal amplification, see e.g., U.S. Pat. Pub. No. US20200399689A1 and Xia et al., Multiplexed Detection of RNA using MERFISH and branched DNA amplification. Scientific Reports (2019), each of which is fully incorporated by reference herein.

In some instances, an oligonucleotide probe described herein can be associated with an amplified signal by a method that comprises signal amplification by performing a primer exchange reaction (PER). In various instances, a primer with domain on its 3' end binds to a catalytic hairpin, and is extended with a new domain by a strand displacing polymerase. For example, a primer with domain 1 on its 3' ends binds to a catalytic hairpin, and is extended with a new domain 1 by a strand displacing polymerase, with repeated cycles generating a concatemer of repeated domain 1 sequences. In various instances, the strand displacing polymerase is Bst. In various instances, the catalytic hairpin includes a stopper which releases the strand displacing polymerase. In various instances, branch migration displaces the extended primer, which can then dissociate. In various instances, the primer undergoes repeated cycles to form a concatemer primer (see e.g., U.S. Pat. Pub. No. US20190106733, which is incorporated herein by reference, for exemplary molecules and PER reaction components).

The disclosed systems, methods, and techniques for implementing standing-wave fluorescence microcopy may be used with a variety of in situ detection and in situ analysis techniques that rely on optical imaging (e.g., fluorescence imaging) to detect the presence and locations of one or more fluorescently-labeled probes (e.g., fluorescently-labeled anchor probes, intermediate probes and/or detection probes) to infer the identity or sequence of a target analyte (e.g., an mRNA molecule), or a nucleic acid barcode associated with a target analyte in a sample as described herein. In some instances, the methods disclosed herein can be used with any of the assays for in situ detection and analysis provided herein.

Figure 8:
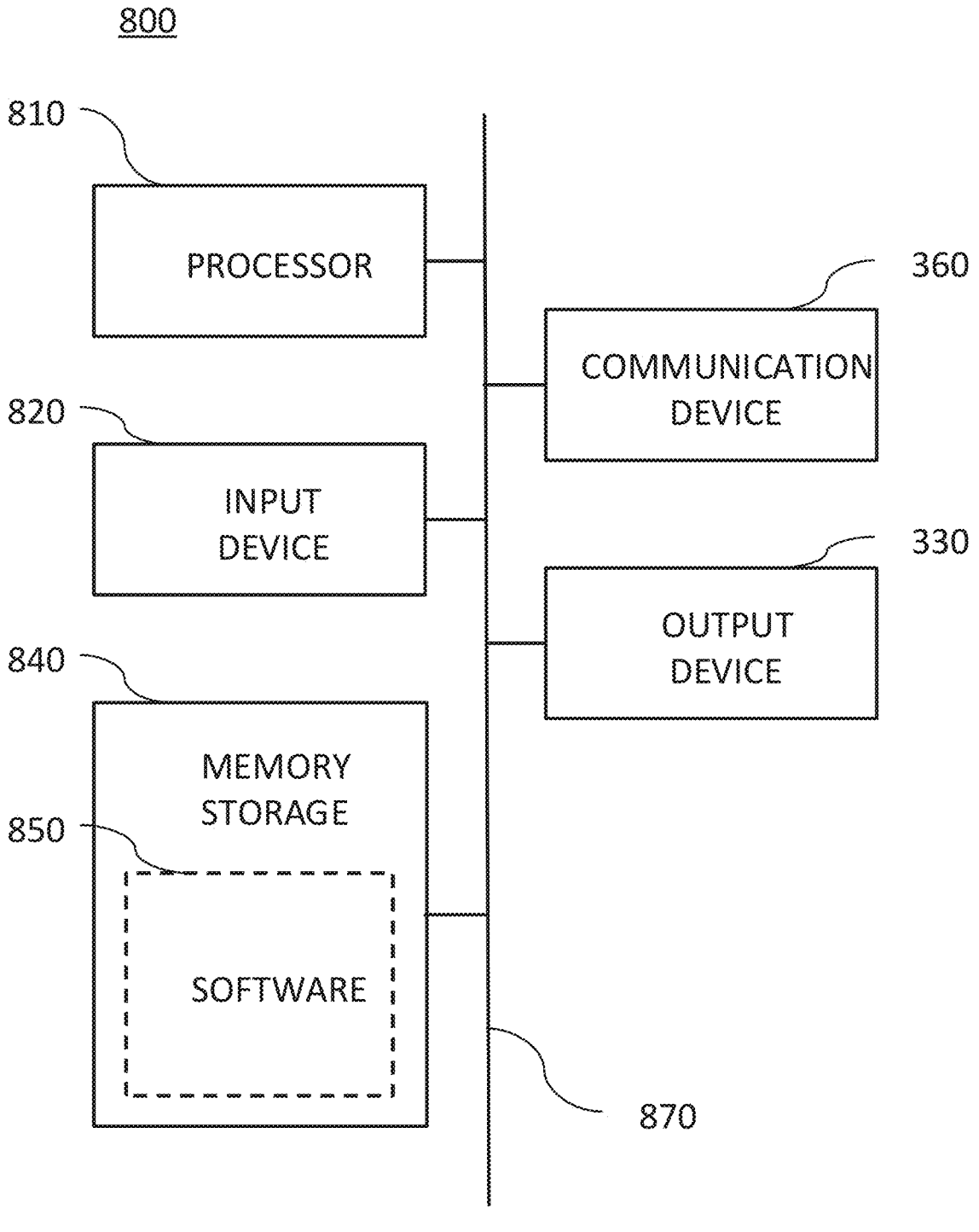
FIG. 8 shows a schematic diagram of a computing device or system, in accordance with some embodiments.

FIG. 8 shows a schematic diagram of a computing device or system 800, in accordance with some embodiments. Device 800 can be a host computer connected to a network. Device 800 can be a client computer or a server. As shown in FIG. 8, device 800 can be any suitable type of microprocessor-based device, such as a personal computer, workstation, server, or handheld computing device (portable electronic device), such as a phone or tablet. The device can include, for example, one or more of processor 810, input device 820, output device 830, memory/storage 840, and communication device 860. Input device 820 and output device 830 can generally correspond to those described above, and they can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic, or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus 870 or wirelessly.

Software 850, which can be stored in memory/storage 840 and executed by processor 810, can include, for example, the programming that embodies the functionality of the present disclosure (e.g., as embodied in the devices described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java, or Python. In various implementations, application software embodying the functionality of the present disclosure can be deployed in different configurations, such as in a client/ server arrangement or through a web browser as a web-based application or web service, for example.

It should be understood from the foregoing that, while particular implementations of the disclosed methods, devices, and systems have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for fluorescence imaging of a sample using structured illumination, comprising:

generating a tilted structured illumination pattern for use in an optical system, wherein the tilted structured illumination pattern is based on exactly two wave vectors that are not symmetrical about a center point of a back pupil of the system, and wherein the tilted structured illumination pattern defines spatial frequencies along an optical axis of an objective of the system;

directing the tilted structured illumination pattern to be incident on a sample, such that one or more fluorophores of the sample are excited by the structured illumination pattern;

varying a phase of the tilted structured illumination pattern;

capturing a set of images of fluorescence emission emitted by one or more of the fluorophores of the sample, wherein each image of the set of images corresponds to a respective phase of the tilted structured illumination pattern and to a respective axial imaging plane; and generating combined image data based on the set of images.

2. The method of claim 1, wherein generating the tilted structured illumination pattern comprises using a sample conjugate optical grating or a sample conjugate spatial light modulator.

3. The method of claim 1, wherein generating the tilted structured illumination pattern comprises using a pupil conjugate mask.

4. The method of claim 1, wherein generating the tilted structured illumination pattern comprises:

generating a first beam and a second beam having a relative phase difference; and combining the first beam and the second beam in a spatial distribution that is asymmetrical with respect to a back pupil of the system, to create the tilted structured illumination pattern.

5. The method of claim 4, wherein combining the first beam and the second beam comprises directing one of the first beam and the second beam into the center point of the back pupil of the system.

6. The method of claim 4, wherein generating the tilted structured illumination pattern comprises controlling the relative phase difference between the first beam and the second beam.

7. The method of claim 6, wherein controlling relative phase difference comprises applying an electro-optic retarder or a physical delay to one of the first beam and the second beam.

8. The method of claim 1, wherein directing the tilted structured illumination pattern to be incident on the sample comprises rotating the second beam around an edge of a pupil.

9. The method of claim 1, wherein the combined image data has at least double the nominal axial resolution of the objective.

10. The method of claim 1, wherein the combined image data has an axial resolution of $\lambda/2(n-\sqrt{n^2-(NA)^2}))$.

11. The method of claim 1, wherein a curve of integrated power against axial position for the combined image data has a full-width-half-max (FWHM) that is less than or equal to 80% the width of a FWHM of a curve of integrated power against axial position for a combined image generated using optical-sectioning structured illumination microscopy (OS-SIM) generated using the optical system and a structured illumination pattern configured for OS-SIM imaging.

12. The method of claim 1, wherein the set of images comprises six or more images.

13. The method of claim 1, wherein the set of images is a set of exactly six images.

14. The method of claim 1, wherein the sample comprises one or more punctate structures having sub-diffractive structures.

15. The method of claim 1, wherein the sample comprises one or more structures that are sub-diffractive in an axial direction of the objective but that are not sub-diffractive in a lateral direction of the objective.

16. The method of claim 1, wherein the sample comprises a tissue sample comprising fluorescence probes.

17. The method of claim 1, wherein an optical axis of illumination of the system is decentered from the optical axis of the objective of the system.

18. A system for fluorescence imaging of a sample using structured illumination, comprising:

a light source configured to generate illumination light;

a wave vector control device configured to generate a tilted structured illumination pattern for use in an optical system, wherein the tilted structured illumination pattern is based on exactly two wave vectors that are not symmetrical about a center point of a back pupil of the system, and wherein the tilted structured illumination pattern defines spatial frequencies along an optical axis of an objective of the system;

an objective configured to direct the tilted structured illumination pattern to be incident on a sample, such that one or more fluorophores of the sample are excited by the structured illumination pattern;

wherein the wave vector control device is configured to vary the phase of the tilted structured illumination pattern;

a sensor configured to capture a set of images of fluorescence emission emitted by one or more of the fluorophores of the sample, wherein each image of the set of images corresponds to a respective phase of the tilted structured illumination pattern and to a respective axial imaging plane; and one or more processors configured to generate combined image data based on the set of images.

19. The system of claim 18, wherein the wave vector control device comprises a sample conjugate optical grating or a spatial light modulator.

20. The system of claim 18, wherein the wave vector control device comprises a pupil conjugate mask.

21. A computer program product comprising a computer readable storage medium having program instructions embodied therewith, the program instructions executable by a processor to cause the processor to perform a method comprising:

generating, by a wave vector control device, a tilted structured illumination pattern for use in an optical system, wherein the tilted structured illumination pattern is based on exactly two wave vectors that are not symmetrical about a center point of a back pupil of the system, wherein the tilted structured illumination pattern defines spatial frequencies along an optical axis of an objective of the system;

directing, by the objective, the tilted structured illumination pattern to be incident on a sample, such that one or more fluorophores of the sample are excited by the structured illumination pattern;

varying, by the wave vector control device, a phase of the tilted structured illumination pattern;

capturing, by the sensor, a set of images of fluorescence emission emitted by one or more of the fluorophores of the sample, wherein each image of the set of images corresponds to a respective phase of the tilted structured illumination pattern and to a respective axial imaging plane; and generating, by the one or more processors, combined image data based on the set of images.

\* \* \* \* \*